US012030712B2

(12) United States Patent
Hokari et al.

(10) Patent No.: US 12,030,712 B2
(45) Date of Patent: Jul. 9, 2024

(54) TRANSPORT CONTAINER AND TRANSPORT METHOD

(71) Applicant: HITACHI HIGH-TECH CORPORATION, Tokyo (JP)

(72) Inventors: Junpei Hokari, Tokyo (JP); Tadao Yabuhara, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 58 days.

(21) Appl. No.: 18/012,954

(22) PCT Filed: Jul. 1, 2020

(86) PCT No.: PCT/JP2020/025911
§ 371 (c)(1),
(2) Date: Dec. 26, 2022

(87) PCT Pub. No.: WO2022/003877
PCT Pub. Date: Jan. 6, 2022

(65) Prior Publication Data
US 2023/0264890 A1 Aug. 24, 2023

(51) Int. Cl.
*B65D 85/62* (2006.01)
*B01L 3/00* (2006.01)
(Continued)

(52) U.S. Cl.
CPC ................ *B65D 85/62* (2013.01); *B01L 3/56* (2013.01); *B65D 25/2802* (2013.01); *B65D 61/02* (2013.01); *B65D 71/04* (2013.01)

(58) Field of Classification Search
CPC .... B65D 85/62; B65D 25/2802; B65D 61/02; B65D 71/04; B01L 3/56
(Continued)

(56) References Cited

U.S. PATENT DOCUMENTS

2010/0086440 A1* 4/2010 Fattinger .............. G01N 35/028 422/63
2010/0261159 A1* 10/2010 Hess .................... B01J 19/0046 435/7.1
(Continued)

FOREIGN PATENT DOCUMENTS

JP S59-124283 A 7/1984
JP S60-077861 A 5/1985
(Continued)

OTHER PUBLICATIONS

International Search Report with English Translation, PCT/JP2020/025911, Sep. 29, 2020 (4 pgs.).
(Continued)

*Primary Examiner* — Jacob K Ackun
(74) *Attorney, Agent, or Firm* — Volpe Koenig

(57) ABSTRACT

A transport container includes: a bottom member where the transported object is placed; left and right side members disposed beside the bottom member; a handle disposed above the bottom member; left and right lower connecting members interconnecting the bottom member and side members; and left and right upper connecting members interconnecting the side and the handle members, which are respectively interconnected via hinges. When the handle is not lifted, the side members are separated from the bottom member. When the handle is lifted, the side members laterally support the transported object. As for the transport method, with the transported object stacked in the up-down direction, the transport container is installed at an unloading location such that the lower and upper connecting members are laid to be non-parallel to the side member, and the transported object is taken out from the front or rear between the left and right side members.

19 Claims, 25 Drawing Sheets

(51) Int. Cl.
*B65D 25/28* (2006.01)
*B65D 61/02* (2006.01)
*B65D 71/04* (2006.01)

(58) Field of Classification Search
USPC .................................................. 206/454, 499
See application file for complete search history.

(56) References Cited

U.S. PATENT DOCUMENTS

| | | | | |
|---|---|---|---|---|
| 2012/0272500 | A1* | 11/2012 | Reuteler .................. | B65G 1/06 414/277 |
| 2022/0411210 | A1* | 12/2022 | Städler ................... | G01N 35/04 |
| 2023/0013072 | A1* | 1/2023 | Stiess ................... | B65D 5/4212 |

FOREIGN PATENT DOCUMENTS

| | | | |
|---|---|---|---|
| JP | H09-240720 | A | 9/1997 |
| JP | 3209427 | U | 3/2017 |
| JP | 2018-062360 | A | 4/2018 |

OTHER PUBLICATIONS

English Translation of the Written Opinion of the International Searching Authority , PCT/JP2020/025911, Sep. 29, 2020 (2 pgs.).

* cited by examiner

TRANSPORT CONTAINER AND TRANSPORT METHOD

TECHNICAL FIELD

The present invention relates to a transport container used for transporting transported objects stackable in the up-down direction and a transport method for individually taking out transported objects stacked and accommodated in a transport container.

BACKGROUND ART

In fields such as medical care, hygiene management, food inspection, and biochemistry, spectroscopic analysis is performed using fluorescent labels and specific wavelengths. Microplates are widely used in quantifying and identifying specimens in quantity. In general, a microplate is formed of synthetic resin or the like and has a structure in which multiple wells are provided on a flat plate.

Some microplates have a flat lower surface or have a lower surface molded as an embossed recess with respect to an upper surface having a well. In many cases, a microplate having a lower surface molded as a recess can be fitted on a sample stage of an analyzer or the like or another microplate of the same type. A microplate having such a shape can be fixed on the sample stage or the microplate without positional deviation.

In addition, a perforated plate-shaped cover, a non-perforated plate-shaped cover, a film-shaped cover, or the like capable of sealing each well may be attached to the upper surface of a microplate. The plate-shaped cover is also often molded into a shape in which another microplate is fittable or a shape that does not interfere with another microplate.

In this manner, many microplates are generally provided as a structure stackable in the up-down direction. In the related art, a sample liquid containing a specimen is manually dispensed into a microplate well using a micropipette or the like. In a case where a sample liquid preparation and dispensing location is away from an analysis location, a sample liquid-dispensed microplate needs to be transported to the analysis location.

Microplates stackable in the up-down direction can be transported in a stacked state in a case where many are to be analyzed at once. However, the microplates that are stacked are limited in terms of where those can be held. During spectroscopic analysis, analysis light is projected onto the microplate, and there is also a case where, for example, a sample liquid contains a harmful substance that should not be touched or contamination attributable to manual work is a concern. Accordingly, as for microplates, holding a part other than the upper surface is usually recommended.

JP2018-062360A (PTL 1) describes a container for cryobox transport and storage. The container described in PTL 1 is a hand-carry container in which a grip portion is provided on a rack. A shelf-shaped structure for individual cryobox storage is provided as a storage portion for cryobox storage.

CITATION LIST

Patent Literature

PTL 1: JP2018-062360A

SUMMARY OF INVENTION

Technical Problem

As for sample liquid-dispensed microplates, analysis of many may be performed at once, and quick transport may be desired depending on, for example, the properties of the specimen. Mixing between sample liquids may occur even in a case where a perforated plate-shaped cover or the like is attached, and thus the microplate is a transported object that should avoid tilting and falling as much as possible. Under these circumstances, there is a demand for a transport container capable of simultaneously transporting a large amount of transported objects of high manual transport risk such as sample liquid-dispensed microplates.

In transporting transported objects stackable in the up-down direction, such as microplates, a container structure capable of accommodating the transported objects that are stacked is desired from the viewpoint of work throughput improvement. In addition, in transporting sample liquid-dispensed microplates or the like, mixing between sample liquids or the like may arise due to tilting or falling, and thus a container structure for stably maintaining a stacked state is also desired.

The container described in PTL 1 has a shelf-shaped structure for individually storing cryoboxes, which are transported objects, and thus it can be said that tilting and falling of the transported objects can be prevented to some extent. However, in the container structure described in PTL 1, a lid member needs to be opened and closed each time the transported object is put in and taken out, which problematically complicates transport.

In some cases, hand-touching the transported object itself as well as the risk of manual transport should be avoided. In a case where the sample liquid-dispensed microplate is provided for spectroscopic analysis, touching the upper surface of the microplate, which affects the analysis, should be avoided as much as possible. In addition, in transporting a harmful substance such as a chemical and a pathogen or a precision instrument, the transported object should not be manually put into and taken out of the transport container.

Accordingly, it is also desired that a transport container has a container structure with which stacked transported objects are accommodated and the transported objects are easily put in and taken out using a machine or an instrument. The container structure described in PTL 1 has a shelf-shaped structure for individually storing transported objects and thus is problematic in that the transport container is likely to interfere with a machine or an instrument and the objects are not easily put in and taken out using a machine or an instrument.

In this regard, an object of the present invention is to provide a transport container and a transport method using the transport container with which transported objects can be easily put in and taken out and the transported objects stackable in the up-down direction can be efficiently transported.

Solution to Problem

A transport container according to the present invention for solving the above problems is used for transporting transported objects and includes: a bottom member where the transported object is placed; left and right side members disposed beside the bottom member; a handle member disposed above the bottom member; left and right lower connecting members interconnecting the bottom member and the side members; and left and right upper connecting members interconnecting the side members and the handle member, in which the bottom member and the lower connecting members, the lower connecting members and the side members, the side members and the upper connecting members, and the upper connecting members and the handle member are respectively interconnected via left and right hinges having rotating shafts parallel and horizontal with respect to left and right side surfaces of the bottom member, when the handle member is not lifted, the lower connecting members and the upper connecting members are laid to be non-parallel to the side members and the side members are separated from the bottom member, and when the handle member is lifted, the lower connecting members and the upper connecting members become upright and the side members approach the bottom member to laterally support the transported object placed on the bottom member.

In addition, a transport method according to the present invention is for individually taking out transported objects stacked in an up-down direction and accommodated in a transport container, in which the transport container is used for transporting the transported objects and includes: a bottom member where the transported object is placed; left and right side members disposed beside the bottom member; a handle member disposed above the bottom member; left and right lower connecting members interconnecting the bottom member and the side members; and left and right upper connecting members interconnecting the side members and the handle member, the bottom member and the lower connecting members, the lower connecting members and the side members, the side members and the upper connecting members, and the upper connecting members and the handle member are respectively interconnected via left and right hinges having rotating shafts parallel and horizontal with respect to left and right side surfaces of the bottom member, when the handle member is not lifted, the lower connecting members and the upper connecting members are laid to be non-parallel to the side members and the side members are separated from the bottom member, when the handle member is lifted, the lower connecting members and the upper connecting members become upright and the side members as structures approach the bottom member to laterally support the transported object placed on the bottom member, with the transported object stacked in the up-down direction and accommodated, the transport container is installed at an unloading location such that the lower connecting member and the upper connecting member are laid to be non-parallel to the side member, and the transported object placed on the bottom member is taken out from a front or rear between the left and right side members.

Advantageous Effects of Invention

According to the present invention, it is possible to provide a transport container and a transport method using the transport container with which transported objects can be easily put in and taken out and the transported objects stackable in the up-down direction can be efficiently transported.

DESCRIPTION OF EMBODIMENTS

Figure 1:
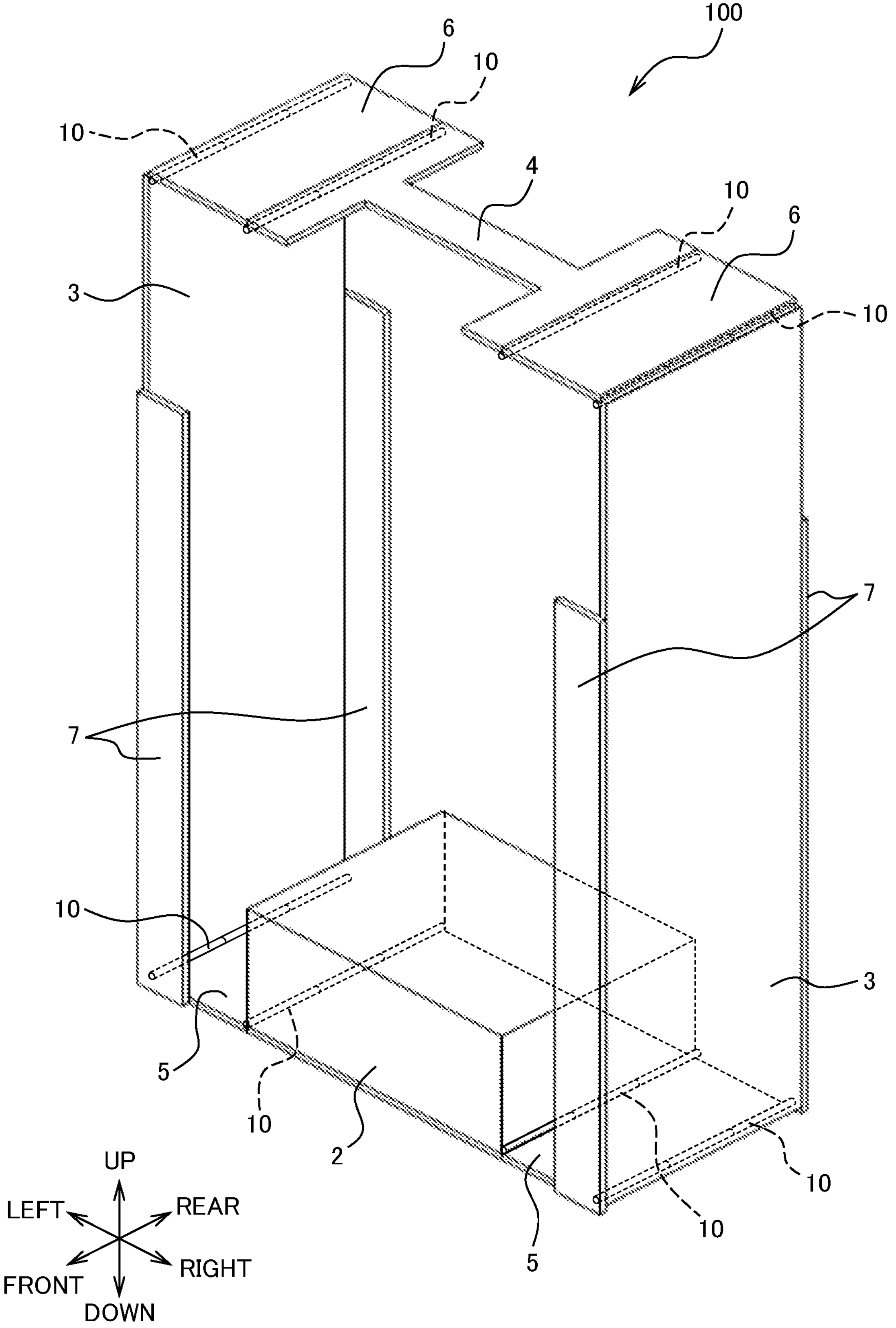
FIG. 1 is a perspective view illustrating a transport container according to one embodiment of the present invention.

Hereinafter, a transport container and a transport method according to one embodiment of the present invention will be described with reference to the drawings. It should be noted that in the drawings, the same reference numerals are given to common configurations with redundant description omitted.

Figure 2:
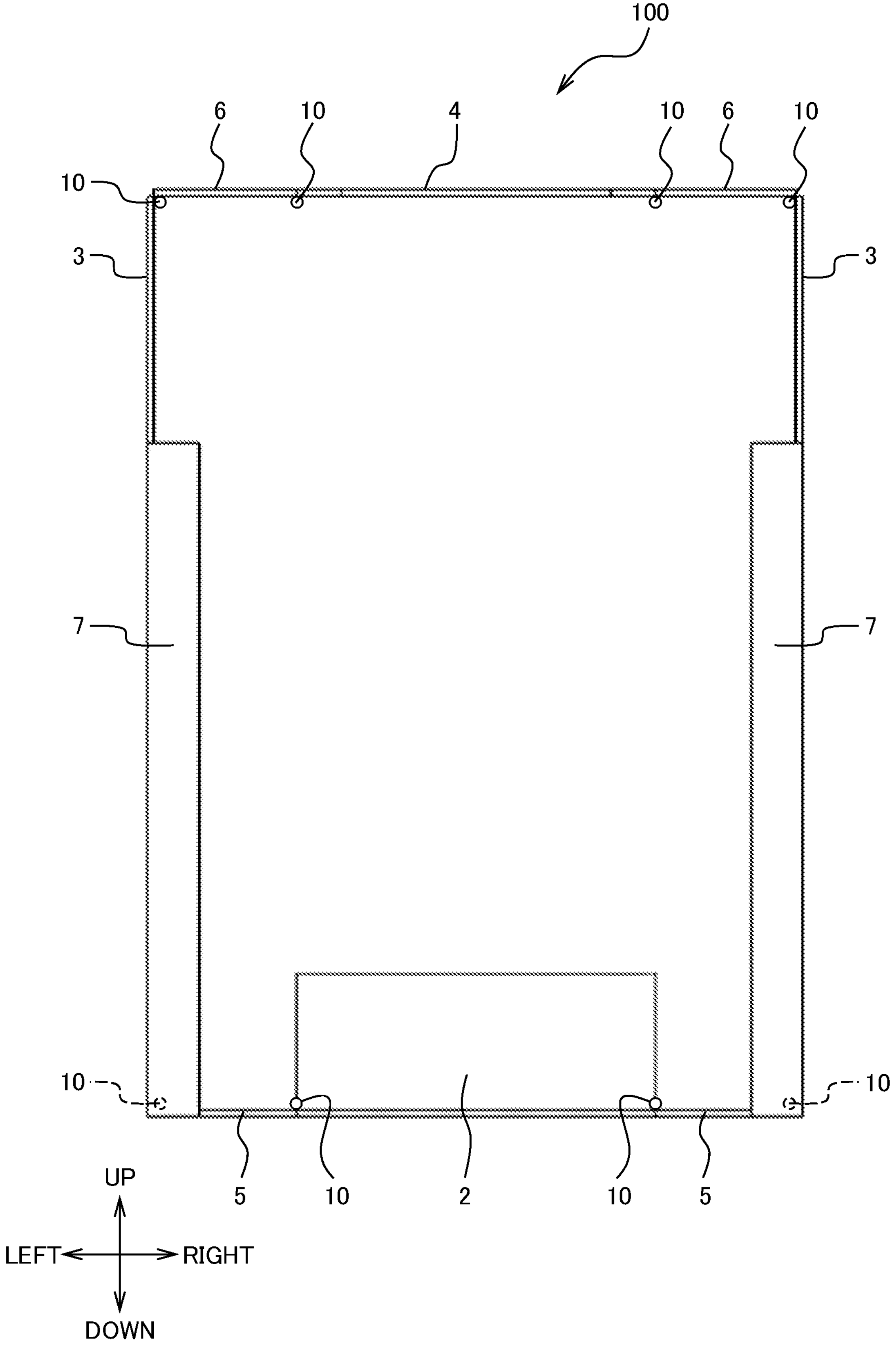
FIG. 2 is a front view illustrating the transport container according to one embodiment of the present invention.
Figure 3:
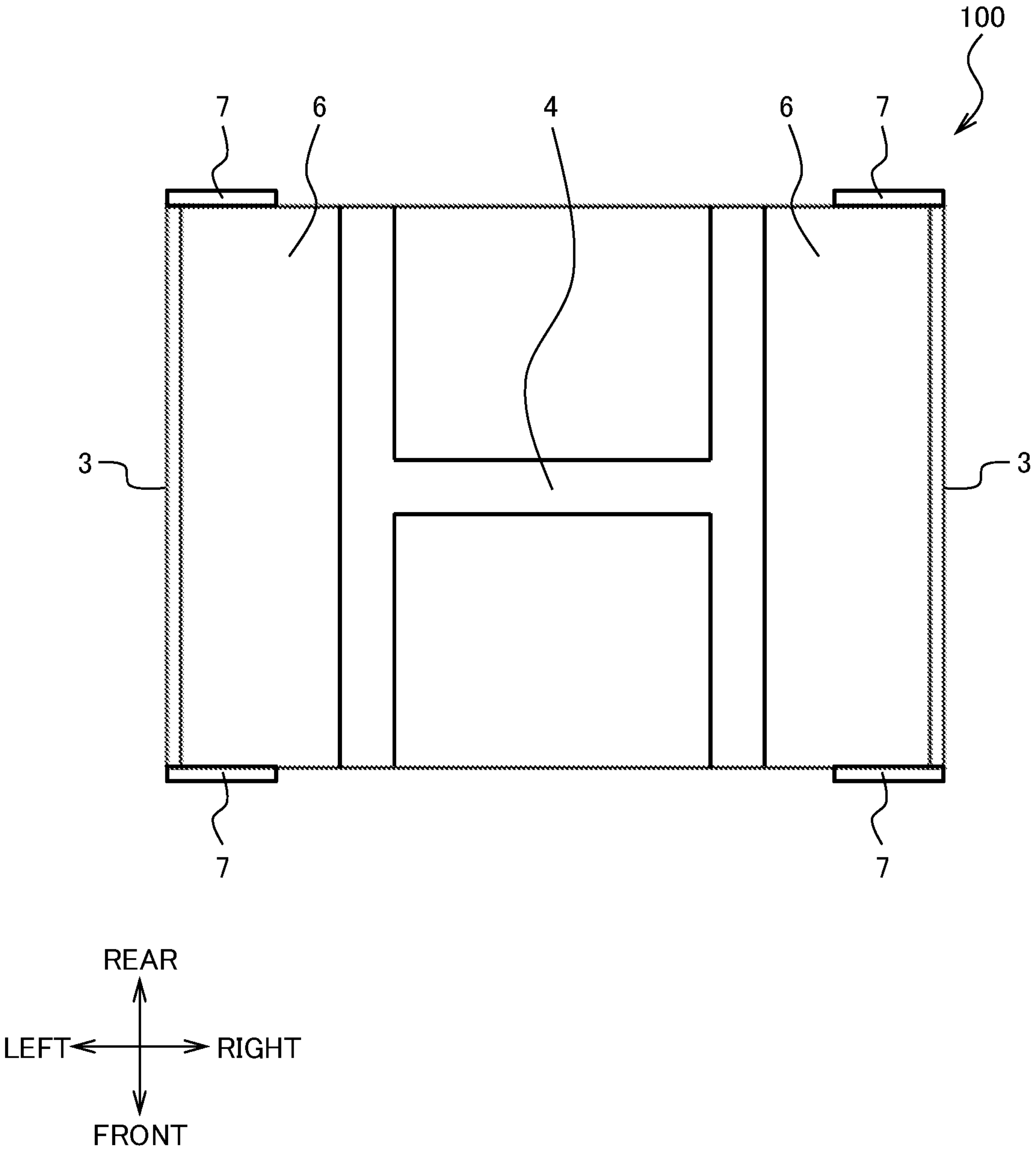
FIG. 3 is a plan view illustrating the transport container according to one embodiment of the present invention.

FIG. 1 is a perspective view illustrating the transport container according to one embodiment of the present invention. FIG. 2 is a front view illustrating the transport container according to one embodiment of the present invention. FIG. 3 is a plan view illustrating the transport container according to one embodiment of the present invention.

FIGS. 1, 2, and 3 illustrate a state where the transport container that is grounded without being hand-carried is viewed from each direction with no transported object accommodated.

As illustrated in FIGS. 1, 2, and 3, a transport container 100 according to the present embodiment includes a bottom member 2, left and right side members 3 and 3, a handle member 4, left and right lower connecting members 5 and 5, and left and right upper connecting members 6 and 6. The side members 3, the lower connecting members 5, and the upper connecting members 6 are provided in bilateral symmetry in the left-right direction of the transport container 100.

The transport container 100 according to the present embodiment is mainly used for transporting a transported object that can be stacked in the up-down direction. The transport container 100 is a transport container accommodating a plurality of transported objects that are mutually stacked in the up-down direction and capable of transporting a large amount at once. The transport container 100 can be transported by hand-carrying by lifting the handle member 4. However, the transport container 100 may be lifted and transported not by a human hand but by a machine or an instrument insofar as the handle member 4 is lifted.

An object with a cross section having a rectangular outer shape is preferable as the transported object transported using the transport container 100. The transported object may have any of, for example, a plate shape, a block shape, a frame shape, a dish shape, and so on. The transported objects that can be stacked in the up-down direction include those mutually fittable on the upper and lower surface sides and having fixed relative positions in the horizontal direction in a state of being mutually stacked and those having unfixed relative positions in the horizontal direction in a state of being mutually stacked. Any of these may be the transported object transported using the transport container 100.

As illustrated in FIG. 1, the transport container 100 has a substantially rectangular parallelepiped appearance. The bottom member 2 is disposed in the bottom portion of the transport container 100. The side members 3 are disposed in the right and left side portions of the transport container 100, respectively. The handle member 4 is disposed in the ceiling portion of the transport container 100. The front and rear portions of the transport container 100 are openings so that transported objects can be put in and taken out.

The bottom member 2 is where a transported object is placed. In a case where transported objects that can be stacked in the up-down direction are transported, the transported objects are placed on the bottom member 2 so as to be stacked in the up-down direction. In FIGS. 1 to 3, the bottom member 2 is provided as a substantially rectangular parallelepiped member having a flat upper surface. The lengths of the bottom member 2 in the front-rear and left-right directions are approximately equal respectively to the length and width of the transported object such that the bottom member 2 and the transported object (see reference numeral 1 in FIG. 4) substantially overlap in a plan view of the transport container 100.

The left and right side members 3 are disposed on the left and right sides of the bottom member 2, respectively. In FIGS. 1 to 3, the side member 3 is provided as a thin plate material having a flat main surface. The left and right side members 3 are disposed in an upright state with the main surfaces directed in the left-right direction so as to face each other. The length of the side member 3 in the up-down direction is sufficiently long with respect to the thickness of the transported objects such that the stacked transported objects can be accommodated between the bottom member 2 and the handle member 4. The length of the side member 3 in the front-rear direction is approximately equal to the length of the bottom member 2 in the front-rear direction.

The handle member 4 is disposed above the bottom member 2. In FIGS. 1 to 3, the handle member 4 is provided as a thin plate material integrated with a handle for hand-carrying the transport container 100. The handle member 4 is disposed so as to bridge between the left and right side members 3. The lengths of the handle member 4 in the front-rear and left-right directions are approximately equal to the lengths of the bottom member 2 in the front-rear and left-right directions, respectively.

The left and right lower connecting members 5 interconnect the bottom member 2 and the side members 3. In FIGS. 1 to 3, the lower connecting member 5 is provided as a thin plate material. The lower connecting member 5 on the right side connects the lower end of the right side surface of the bottom member 2 and the lower end of the side member 3 on the right side with the flat surface of the plate material. The lower connecting member 5 on the left side connects the lower end of the left side surface of the bottom member 2 and the lower end of the side member 3 on the left side with the flat surface of the plate material. The length of the lower connecting member 5 in the front-rear direction is approximately equal to the length of the bottom member 2 in the front-rear direction and the length of the side member 3 in the front-rear direction.

The left and right upper connecting members 6 interconnect the side members 3 and the handle member 4. In FIGS. 1 to 3, the upper connecting member 6 is provided as a thin plate material. The upper connecting member 6 on the right side connects the upper end of the side member 3 on the right side and the right end of the handle member 4 with the flat surface of the plate material. The upper connecting member 6 on the left side connects the upper end of the side member 3 on the left side and the left end of the handle member 4 with the flat surface of the plate material. The length of the upper connecting member 6 in the front-rear direction is approximately equal to the length of the side member 3 in the front-rear direction and the length of the handle member 4 in the front-rear direction.

Each of the bottom member 2, the left and right side members 3, the handle member 4, the left and right lower connecting members 5, and the left and right upper connecting members 6 can be formed of, for example, various metal materials such as aluminum alloy, stainless steel, and carbon steel or various synthetic resin materials such as acrylic resin, polystyrene, polyethylene, polypropylene, polyester, polycarbonate, and ABS resin.

Figure 4:
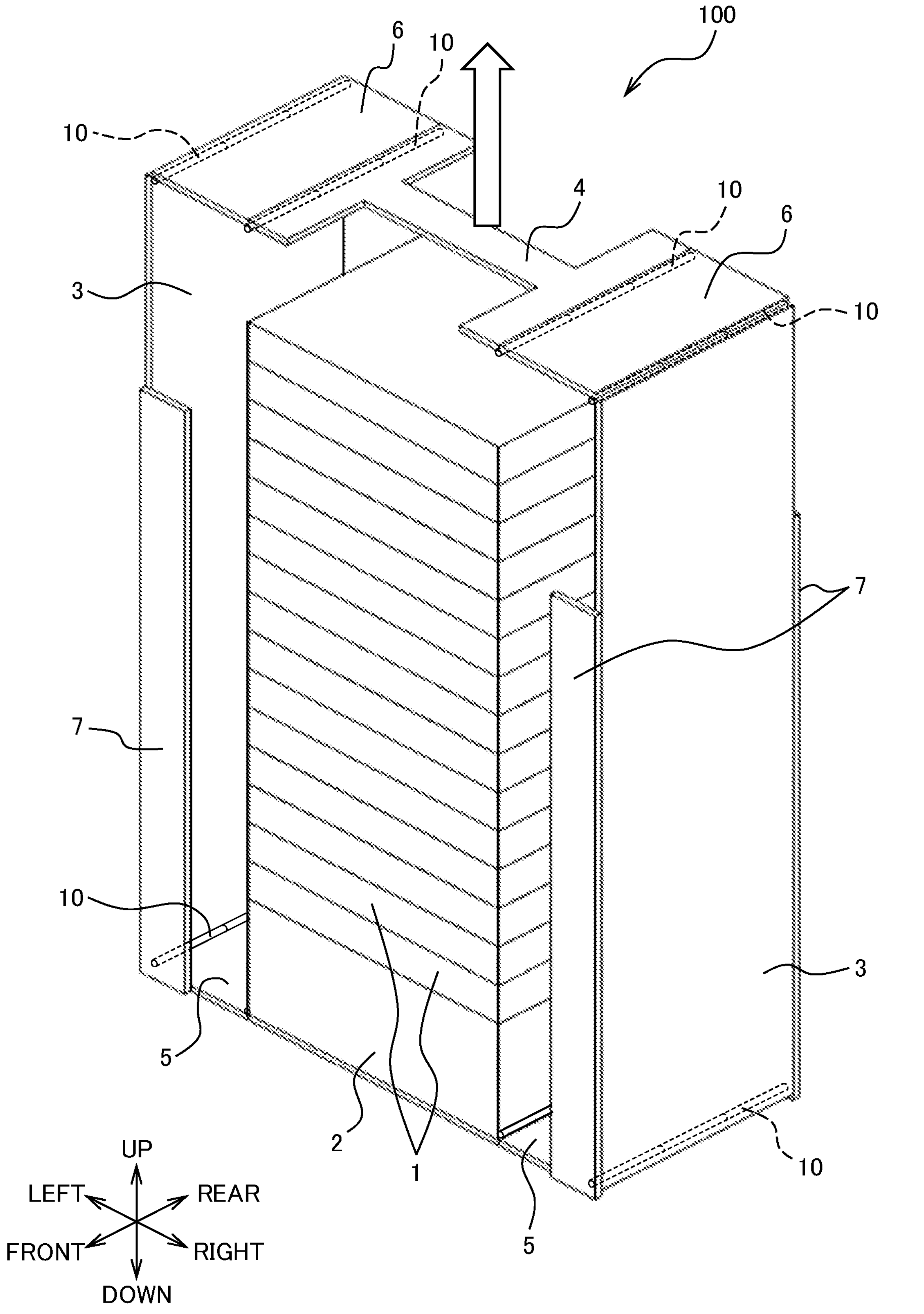
FIG. 4 is a perspective view illustrating a state where the transport container according to one embodiment of the present invention is grounded with transported objects accommodated.
Figure 5:
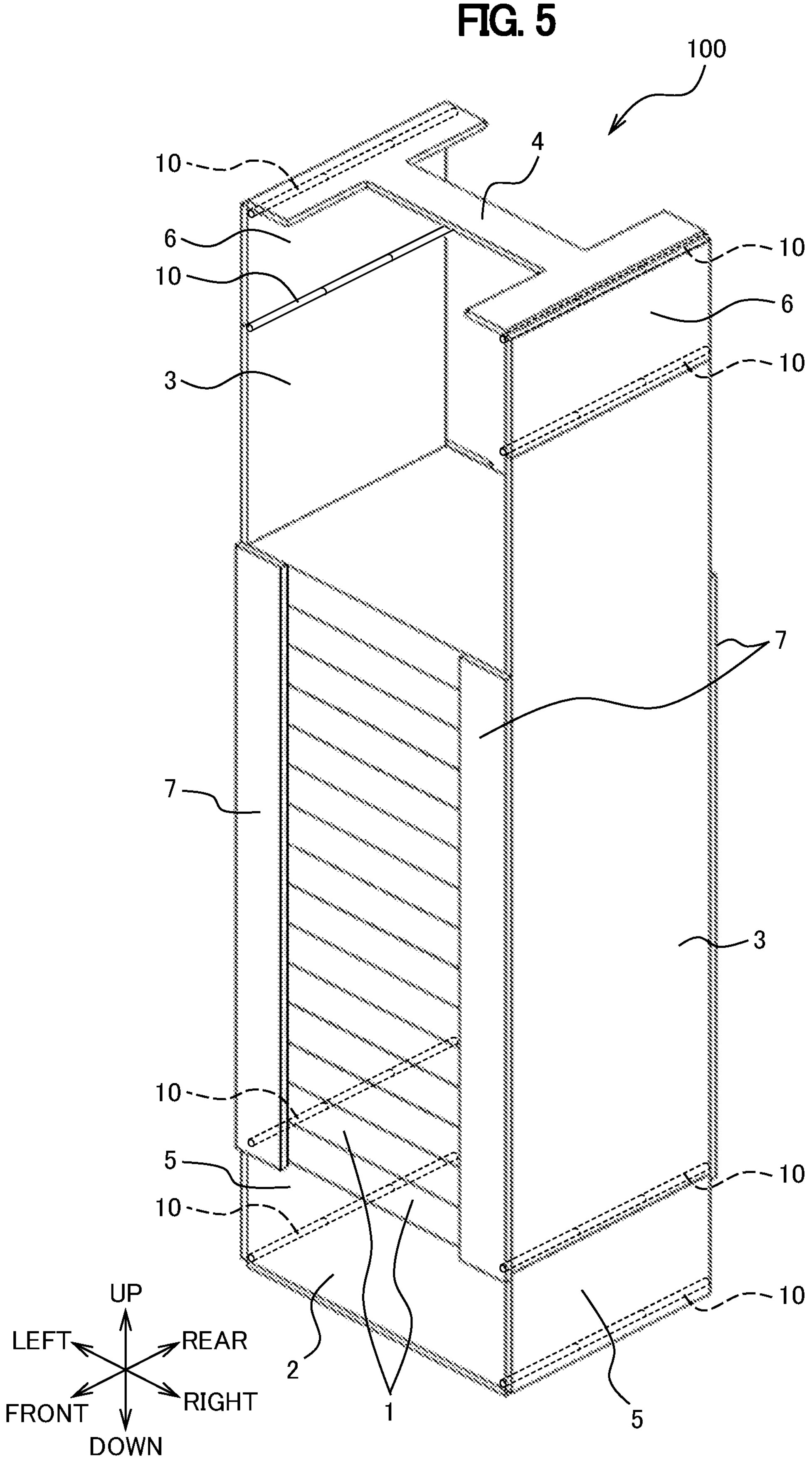
FIG. 5 is a perspective view illustrating a state during the transport of the transport container according to one embodiment of the present invention.

FIG. 4 is a perspective view illustrating a state where the transport container according to one embodiment of the present invention is grounded with transported objects accommodated. FIG. 5 is a perspective view illustrating a state during the transport of the transport container according to one embodiment of the present invention.

FIGS. 4 and 5 illustrate a state where plate-shaped transported objects indicated by reference numeral 1 are stacked and accommodated in the up-down direction with respect to the transport container 100 illustrated in FIGS. 1 to 3.

As illustrated in FIGS. 4 and 5, the transport container 100 is a variable container that changes in shape in conjunction with the lifting of the handle member 4. As illustrated in FIG. 4, when the handle member 4 is not lifted, transported objects can be put into and taken out of the transport container 100. On the other hand, when the handle member 4 is lifted as indicated by the arrow, the transported objects accommodated in the transport container 100 are supported from therearound as illustrated in FIG. 5.

The bottom member 2 and the left and right lower connecting members 5, the lower connecting members 5 and the side members 3, the side members 3 and the upper connecting members 6, and the left and right upper connecting members 6 and the handle member 4 are interconnected via hinges 10. Each inter-member connection angle changes with the hinge 10 as a fulcrum axis.

The hinges 10 are mutually parallel along the sides extending in the front-rear direction between the respective members and have rotating shafts parallel and horizontal with respect to the left and right side surfaces of the bottom member 2. In other words, the hinge 10 has a rotating shaft parallel to the center line of the bottom member 2 with respect to the left-right direction extending in the front-rear direction and the center line of the transport container 100 with respect to the left-right direction extending in the front-rear direction. The rotating shaft of the hinge 10 is rotatably supported by a tubular support portion provided on each member.

In FIGS. 1 to 5, the support portion of hinge 10 is provided integrally with respect to each member. With such a structure, the number of components of the transport container 100 can be reduced. In addition, a container structure can be provided in which the hinge 10 and each member are unlikely to interfere with each other. However, the support portion of the hinge 10 may be provided separately from each member. The separate support portion can be fixed to each member with a screw or the like.

In FIG. 1, the lower end of the right side surface of the bottom member 2 and the inside end of the lower connecting member 5 on the right side are connected via the hinge 10 on the bottom member side of the lower right portion. One support portion of this hinge 10 is provided along the lower end of the right side surface of the bottom member 2, and the other support portion of this hinge 10 is provided along the inside end of the lower connecting member 5 on the right side.

The hinge 10 on the bottom member side of the lower right portion rotates such that the outer angle between the bottom member 2 and the lower connecting member 5 on the right side becomes approximately 90 degrees from approximately 180 degrees when the handle member 4 is lifted and performs opposite rotation when the handle member 4 is released. With the hinge 10 on the bottom member side of the lower right portion, the lower connecting member 5 on the right side can be operated at any angle between a substantially horizontal lying state (see FIG. 4) and a substantially vertical upright state (see FIG. 5).

Likewise, the lower end of the left side surface of the bottom member 2 and the inside end of the lower connecting member 5 on the left side are connected via the hinge 10 on the bottom member side of the lower left portion. The hinge 10 on the bottom member side of the lower left portion is provided in bilateral symmetry with the hinge 10 on the bottom member side of the lower right portion. With the hinge 10 on the bottom member side of the lower left portion, the lower connecting member 5 on the left side can be operated symmetrically with the right side.

In addition, the outside end of the lower connecting member 5 on the right side and the lower end of the side member 3 on the right side are connected via the hinge 10 on the side member side of the lower right portion. One support portion of this hinge 10 is provided along the outside end of the lower connecting member 5 on the right side, and the other support portion of this hinge 10 is provided along the lower end of the side member 3 on the right side.

The hinge 10 on the side member side of the lower right portion rotates such that the inner angle between the lower connecting member 5 on the right side and the side member 3 on the right side becomes approximately 180 degrees from approximately 90 degrees when the handle member 4 is lifted and performs opposite rotation when the handle member 4 is released. With the hinge 10 on the side member side of the lower right portion, the lower connecting member 5 on the right side can be operated at any angle between a substantially horizontal lying state of being non-parallel to the side member 3 (see FIG. 4) and a substantially vertical upright state (see FIG. 5) with the side member 3 on the right side kept in a substantially vertical upright state.

Likewise, the outside end of the lower connecting member 5 on the left side and the lower end of the side member 3 on the left side are connected via the hinge 10 on the side member side of the lower left portion. The hinge 10 on the side member side of the lower left portion is provided in bilateral symmetry with the hinge 10 on the side member side of the lower right portion. With the hinge 10 on the side member side of the lower left portion, the side member 3 on the left side and the lower connecting member 5 on the left side can be operated symmetrically with the right side.

In addition, the upper end of the side member 3 on the right side and the outside end of the upper connecting member 6 on the right side are connected via the hinge 10 on the side member side of the upper right portion. One support portion of this hinge 10 is provided along the upper end of the side member 3 on the right side, and the other support portion of this hinge 10 is provided along the outside end of the upper connecting member 6 on the right side.

The hinge 10 on the side member side of the upper right portion rotates such that the inner angle between the side member 3 on the right side and the upper connecting member 6 on the right side becomes approximately 180 degrees from approximately 90 degrees and performs opposite rotation when the handle member 4 is released. With the hinge 10 on the side member side of the upper right portion, the upper connecting member 6 on the right side can be operated at any angle between a substantially horizontal lying state of being non-parallel to the side member 3 (see FIG. 4) and a substantially vertical upright state (see FIG. 5) with the side member 3 on the right side kept in a substantially vertical upright state.

Likewise, the upper end of the left side member 3 and the outside end of the upper connecting member 6 on the left side are connected via the hinge 10 on the side member side of the upper left portion. The hinge 10 on the side member side of the upper left portion is provided in bilateral symmetry with the hinge 10 on the side member side of the upper right portion. With the hinge 10 on the side member side of the upper left portion, the side member 3 on the left side and the upper connecting member 6 on the left side can be operated symmetrically with the right side.

In addition, the inside end of the upper connecting member 6 on the right side and the right end of the handle member 4 are connected via the hinge 10 on the handle member side of the upper right portion. One support portion of this hinge 10 on the handle member side is provided along the inside end of the upper connecting member 6 on the right side, and the other support portion of this hinge 10 on the handle member side is provided along the right end of the handle member 4.

The hinge 10 on the handle member side of the upper right portion rotates such that the outer angle between the upper connecting member 6 on the right side and the handle member 4 becomes approximately 90 degrees from approximately 180 degrees and performs opposite rotation when the handle member 4 is released. With the hinge 10 on the handle member side of the upper right portion, the upper connecting member 6 on the right side can be operated between a substantially horizontal lying state of being non-parallel to the side member 3 (see FIG. 4) and a substantially vertical upright state (see FIG. 5).

Likewise, the inside end of the upper connecting member 6 on the left side and the left end of the handle member 4 are connected via the hinge 10 on the handle member side of the upper left portion. The hinge 10 on the handle member side of the upper left portion is provided in bilateral symmetry with the hinge 10 on the handle member side of the upper right portion. With the hinge 10 on the handle member side of the upper left portion, the side member 3 on the left side and the upper connecting member 6 on the left side can be operated symmetrically with the right side.

As illustrated in FIG. 4, when the handle member 4 is not lifted, the left and right side members 3 are separated from the bottom member 2 to the outside in the left-right direction. The openings in the front and rear portions of the transport container 100 are widened to the left and right, and the space above the bottom member 2 is opened. In such a state, a hand, a machine, an instrument, or the like is unlikely to interfere with the side members 3 when the transported object is put in and taken out, and thus the transported object can be put in and taken out with ease.

On the other hand, when the handle member 4 is lifted as illustrated in FIG. 5, the hinges 10 cause the left and right side members 3 to approach the bottom member 2 from the outside in the left-right direction while moving above the bottom member 2. The side members 3 move to the middle side in the left-right direction and are disposed on the upright lower connecting members 5 so as to be on the same plane. The openings in the front and rear portions of the transport container 100 are narrowed up to the length of the bottom member 2 in the left-right direction, and the left and right side ends of the bottom member 2 and the left and right side members 3 substantially overlap in a plan view of the transport container 100. In such a state, the side member 3 is capable of laterally supporting the transported objects placed on the bottom member 2. Accordingly, the side members 3 are capable of aligning the stacked transported objects in the left-right direction and preventing the transported objects in the process of transport from falling in the left-right direction. In addition, the inside ends of the left and right lower connecting members 5 are respectively connected to the side surfaces of the bottom member 2 via the hinges 10 and thus come into surface contact with the left and right side surfaces of the bottom member 2. In such a state, the angles of rotation of the hinges 10 at the inside ends of the left and right lower connecting members 5 are limited. Accordingly, deflection of the overall structure of the transport container 100 can be suppressed and the shaking of the transported objects stacked on the bottom member 2 can be reduced.

As illustrated in FIGS. 1 to 5, in the transport container 100, ribs 7 respectively extending from the front and rear ends of the left and right side members 3 toward the inside in the left-right direction are respectively provided at the front and rear ends of the left and right side members 3. In FIGS. 1 to 5, the ribs 7 are provided as substantially rectangular parallelepiped thin plate pieces at the front and rear ends of the side member 3 on the right side and the front and rear ends of the side member 3 on the left side. The ribs 7 respectively extend from the front and rear ends of the left and right side members 3 toward the inside in the left-right direction.

As illustrated in FIG. 5, when the handle member 4 is lifted, the left and right side members 3 approach the bottom member 2 from the outside in the left-right direction to be disposed on the upright lower connecting members 5 so as to be on the same plane. Then, the front and rear ends of the bottom member 2 and the ribs 7 substantially overlap in a plan view of the transport container 100. In such a state, the ribs 7 are capable of supporting the transported objects placed on the bottom member 2 from the front and rear. Accordingly, the ribs 7 are capable of aligning the stacked transported objects in the front-rear direction and preventing the transported objects in the process of transport from falling in the front-rear direction.

As illustrated in FIG. 3, the rib 7 is provided such that the angle formed with the side member 3 is approximately 90 degrees in a plan view of the transport container 100. The length of the rib 7 in the up-down direction is approximately equal to the length of the side member 3 in the up-down direction. The length of the rib 7 in the left-right direction is shorter than 50% of the length of the bottom member 2 in the left-right direction. By the rib 7 being short in the left-right direction, it is possible to ensure the ease of putting in and taking out the transported object and the visibility of the transported object while preventing the transported object from falling.

Figure 6:
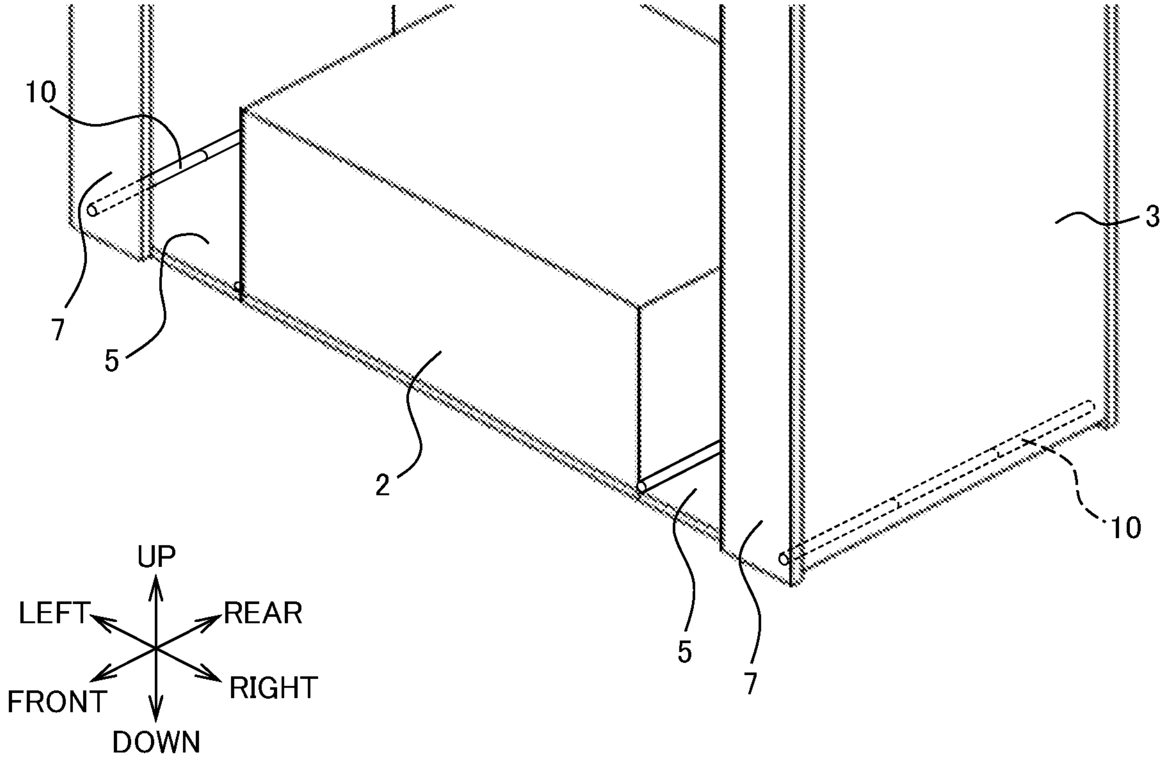
FIG. 6 is an enlarged perspective view illustrating a lower end portion of the transport container according to one embodiment of the present invention.

FIG. 6 is an enlarged perspective view illustrating the lower end portion of the transport container according to one embodiment of the present invention.

As illustrated in FIG. 6, it is preferable that the rib 7 is provided in a shape protruding downward beyond the lower end of the side member 3. In addition, it is preferable that the rib 7 protruding downward is provided in a shape having a horizontal lower end.

In FIG. 6, the rib 7 is provided as a substantially rectangular parallelepiped thin plate piece, and the lower end of the rib 7 is horizontal and substantially parallel to the ground surface of a transport container 1000. The lower end of the rib 7 protrudes downward beyond the lower end of the side member 3, and thus the side member 3 is erected by the rib 7 without being directly grounded.

By providing the ribs 7 having such a shape, when the handle member 4 is not lifted, each of the left and right side members 3 can be made self-reliant with the ribs 7 as support legs. Even in a case where the upper connecting member 6 or the handle member 4 wobbles in the left-right direction, the transport container 100 that is grounded without lifting the handle member 4 can be made self-reliant, and thus the transported object can be put in and taken out with ease.

It should be noted that although the lower end of the rib 7 is horizontal in FIG. 6, the rib 7 can be provided in an appropriate shape insofar as the rib 7 supports the side member 3 at one or more points on each of the front end side and the rear end side of the side member 3. For example, even in a case where only the inside of the lower end of the rib 7 in the left-right direction is point-grounded at one point, the side member 3 can be made self-reliant by the inside of the lower end of the rib 7 in the left-right direction and the lower end of the side member 3.

Figure 7:
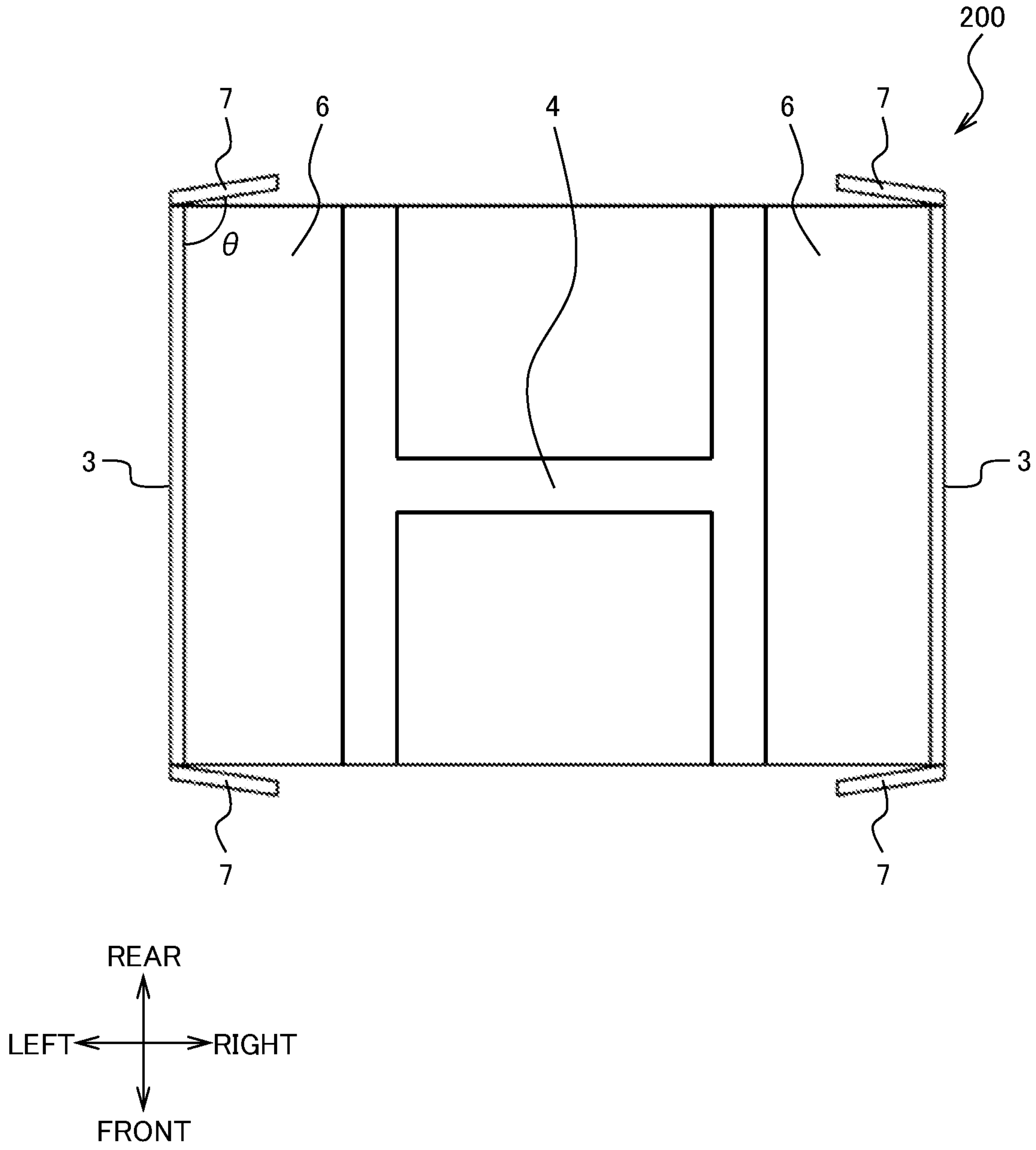
FIG. 7 is a plan view illustrating a transport container according to a modification example of the present invention.

FIG. 7 is a plan view illustrating a transport container according to a modification example of the present invention.

As illustrated in FIG. 7, the transport container used for transporting a transported object is capable of having a form (transport container 200) including the rib 7 provided such that the angle formed with the side member 3 (inner angle indicated by θ in FIG. 7) is an obtuse angle in a plan view of the transport container.

In FIG. 7, the ribs 7 are provided as thin plate pieces at the front and rear ends of the side member 3 on the right side and the front and rear ends of the side member 3 on the left side. In a plan view of the transport container 200, the inner angle between the rib 7 and the side member 3 is 90 degrees or more, and the inside of the rib 7 in the left-right direction is open to the outside in the front-rear direction.

By providing the ribs 7 having such a shape, when the handle member 4 is lifted, the transported objects placed on the bottom member 2 can be aligned using the ribs 7 as guides. When the handle member 4 is lifted, the ribs 7 move to the inside in the left-right direction, and thus the transported objects protruding from the top of the bottom member 2 are guided in the front-rear direction along the ribs 7. Even in a case where the transported objects stacked in the up-down direction are mutually misaligned, the transported objects can be automatically aligned in conjunction with the lifting of the handle member 4, and thus manual work-attributable risks and labor can be reduced.

Figure 8:
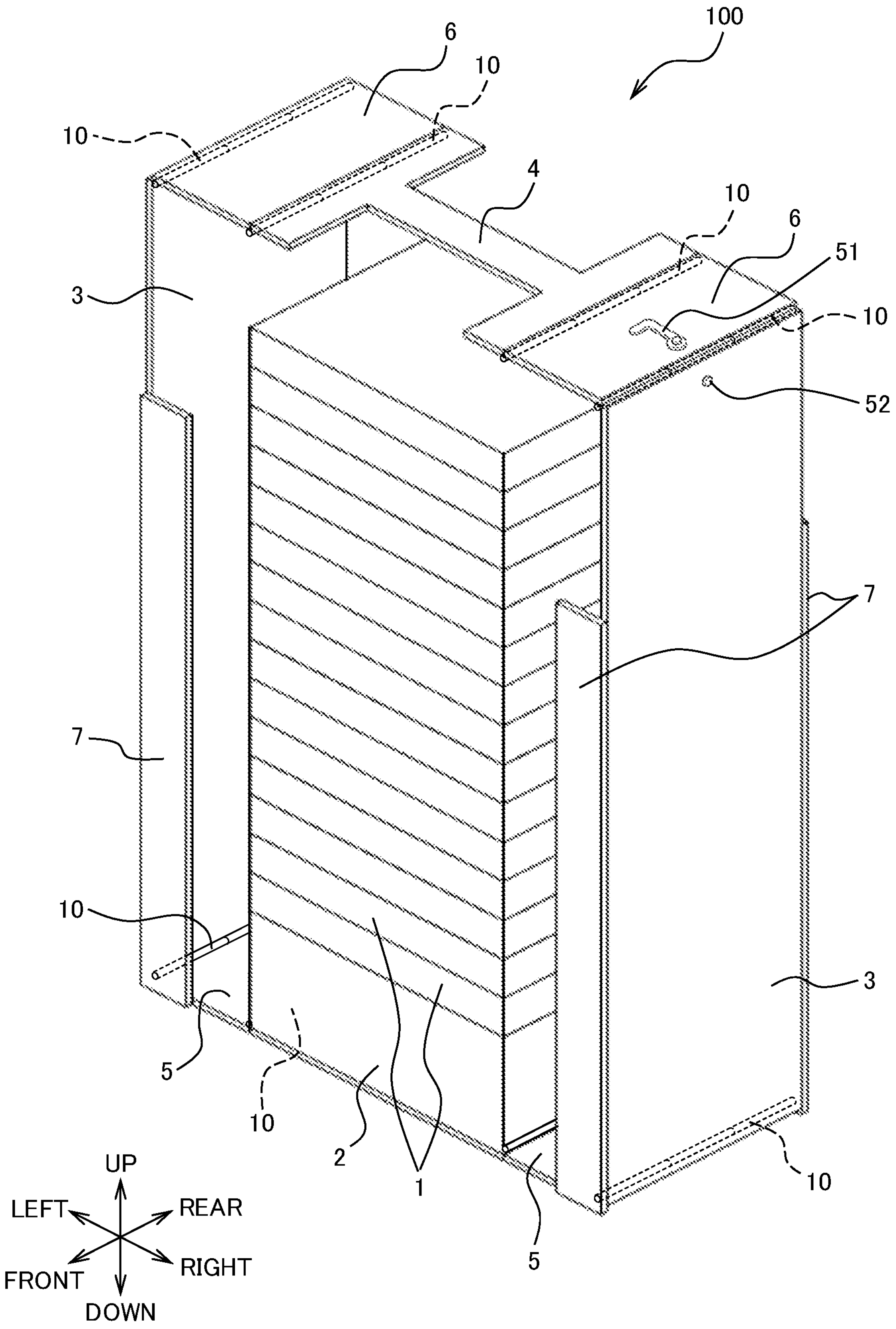
FIG. 8 is a perspective view illustrating a state where the transport container according to a modification example of the present invention is grounded with transported objects accommodated.
Figure 9:
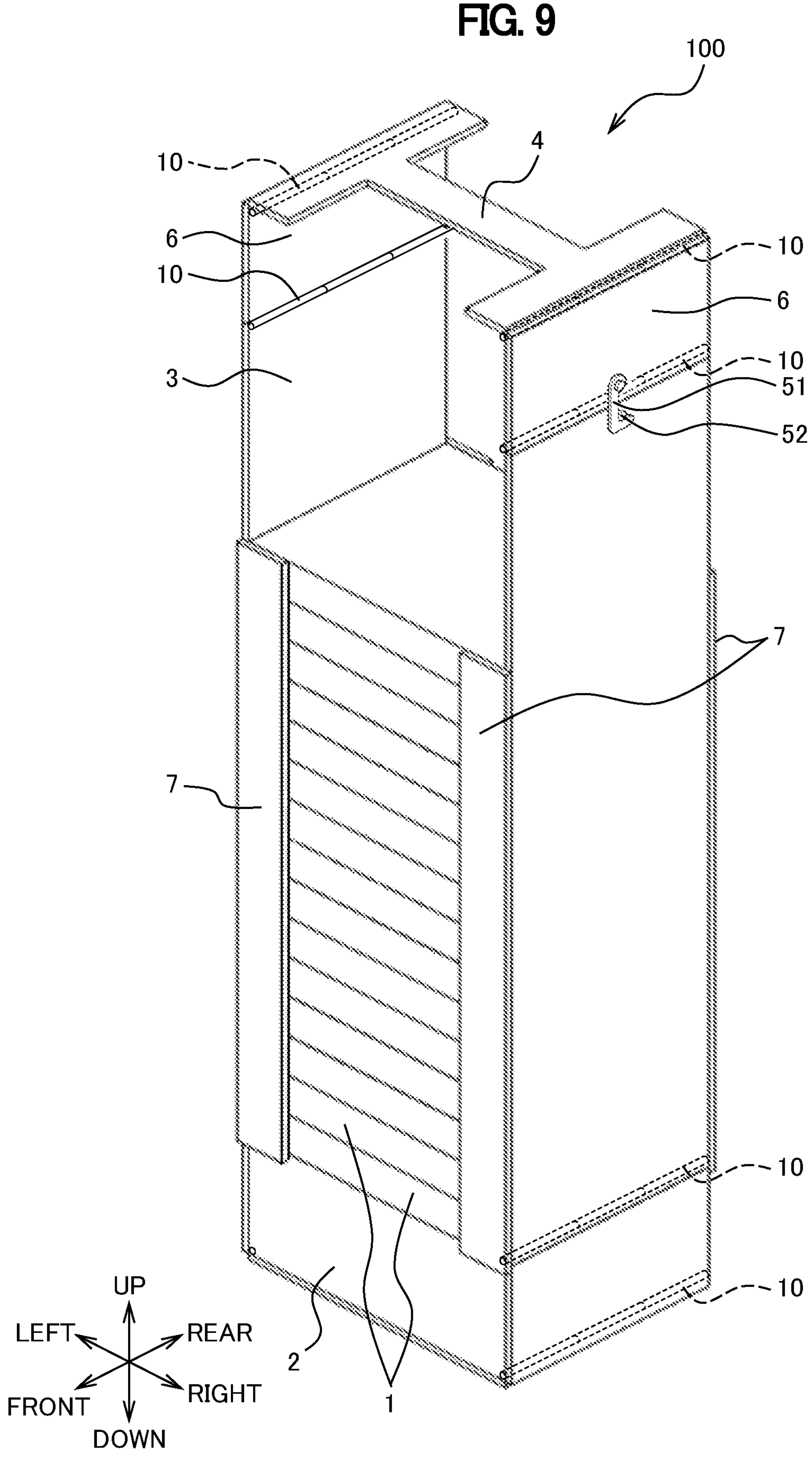
FIG. 9 is a perspective view illustrating a state during the transport of the transport container according to the modification example of the present invention.

FIG. 8 is a perspective view illustrating a state where the transport container according to a modification example of the present invention is grounded with transported objects accommodated. FIG. 9 is a perspective view illustrating a state during the transport of the transport container according to the modification example of the present invention.

As illustrated in FIGS. 8 and 9, the side member 3 and the upper connecting member 6 of the transport container 100 can be provided with stoppers 51 and 52 for locking the upright upper connecting member 6 to the upright side member 3.

In FIGS. 8 and 9, a hook 51 and a capped stud 52 capable of locking the hook 51 are provided as the stoppers 51 and 52. The hook 51 is rotatably supported by a shaft fixed to the outside surface of the upper connecting member 6 on the right side. The stud 52 is fixed to the upper portion side of the outside surface of the side member 3 on the right side.

When the upper connecting member 6 is upright and substantially parallel to the side member 3 as illustrated in FIG. 9, the hook 51 can be hooked on the stud 52 by being rotated about the axis thereof. The hook 51 that is locked to the stud 52 supports the upper connecting member 6 such that the upper connecting member 6 does not fall and works so as to keep the upper connecting member 6 and the side member 3 substantially parallel. Since the stud 52 is capped, the hook 51 does not come out even if the upper connecting member 6 falls. The hook 51 can be disengaged from the stud 52 by being rotated in the opposite direction.

By providing the stoppers 51 and 52, when the handle member 4 is lifted, the upper connecting member 6 and the side member 3 can be kept upright and substantially parallel to each other by locking the upright upper connecting member 6 to the upright side member 3. In addition, even in a case where the handle member 4 is not lifted, wobbling of the side member 3 and so on in the left-right direction can be suppressed. Also in the transport container 100 that is grounded without being hand-carried, the transported object placed on the bottom member 2 can be continuously supported laterally.

It should be noted that in FIGS. 8 and 9, as the stoppers 51 and 52, the hook 51 is provided on the outside surface of the upper connecting member 6 and the stud 52 is provided on the outside surface of the side member 3, and yet the side member 3 may be provided with the hook 51 and the upper connecting member 6 may be provided with the stud 52. In addition, the stoppers 51 and 52 may be provided on the inside surfaces of the respective members instead of the outside surfaces of the respective members.

In addition, the stoppers 51 and 52 may be provided on other members changing in orientation in conjunction with the lifting of the handle member 4. For example, the movable sides of the stoppers 51 and 52 can be provided on the left and right lower connecting members 5 or the left and right side members 3, or the left and right side members 3 or the left and right upper connecting members 6. The fixed sides of the stoppers 51 and 52 can be provided on paired members.

As for the stoppers 51 and 52, the hook 51 and the stud 52 may be replaced with, for example, a doorstop with a hook-catching hole, a slide-type latch, a lever-type latch, a push-type latch, or a box-type latch insofar as the upright lower connecting member 5 or the upright upper connecting member 6 is locked to the upright side member 3. Where the stoppers 51 and 52 are provided may be one place or a plurality of places per transport container 100.

Next, transport containers according to modification examples of the present invention and transport methods using the transport containers will be described with reference to the drawings.

FIGS. 10 to 21 illustrate transport methods for individually taking out and transporting to target locations transported objects stacked in the up-down direction and accommodated in the transport containers. The transport methods illustrated in the drawings are characterized in unloading processes in particular. In these transport methods, an autoloader automatically unloading a transported object is used in taking the transported object out of the transport container. The transport container illustrated in each drawing is provided in a structure corresponding to the autoloader.

FIGS. 10 to 17 illustrate a method for individually taking out, from the lower stage side, the transported objects stacked in the up-down direction and accommodated in the transport container.

In FIGS. 10 to 17, the autoloader includes a movable stage (transported object lifting and lowering means) 61 for lifting the entire transported objects placed on a bottom member 2*a*, a stage lift 62 moving the movable stage 61 up and down, forks (transported object lifting and lowering means) 63 for lifting the stacked transported objects, and a drawer (transported object take-out means) 64 drawing out the transported object in the horizontal direction.

In the transport container illustrated in FIGS. 10 to 17, the pedestal-shaped bottom member 2*a* is provided in the bottom portion of the transport container instead of the substantially rectangular parallelepiped bottom member 2 (see, for example, FIG. 2). The pedestal-shaped bottom member 2*a* is provided in a frame-shaped structure supporting only the outer edge portion of the lower surface of the transported object in the left-right direction. The pedestal-shaped bottom member 2*a* has a penetration structure of penetration in the up-down direction for inserting the movable stage 61 from below the transported object placed on the bottom member 2*a* and a penetration structure of penetration in the front-rear direction for inserting the drawer 64 from the front-rear direction of the bottom member 2*a*. In addition, the movable stage 61 has a penetration structure of penetration in the front-rear direction for inserting the drawer 64.

In addition, in the transport container illustrated in FIGS. 10 to 17, the left and right side portions of the transport container are provided with side members 3A, 3B, 3C, and 3D having through holes 31, 32, 33, and 34 instead of the side members 3 (see, for example, FIG. 1). The side members 3A, 3B, 3C, and 3D have, on the lower side of the main surface, the through holes 31, 32, 33, and 34 for inserting the forks (transported object lifting and lowering means) 63 lifting and lowering the transported objects between the stacked transported objects. The through holes 31, 32, 33, and 34 are respectively provided in the left and right side members 3A, 3B, 3C, and 3D in a laterally elongated slit shape so as to have the same height.

Figure 10:
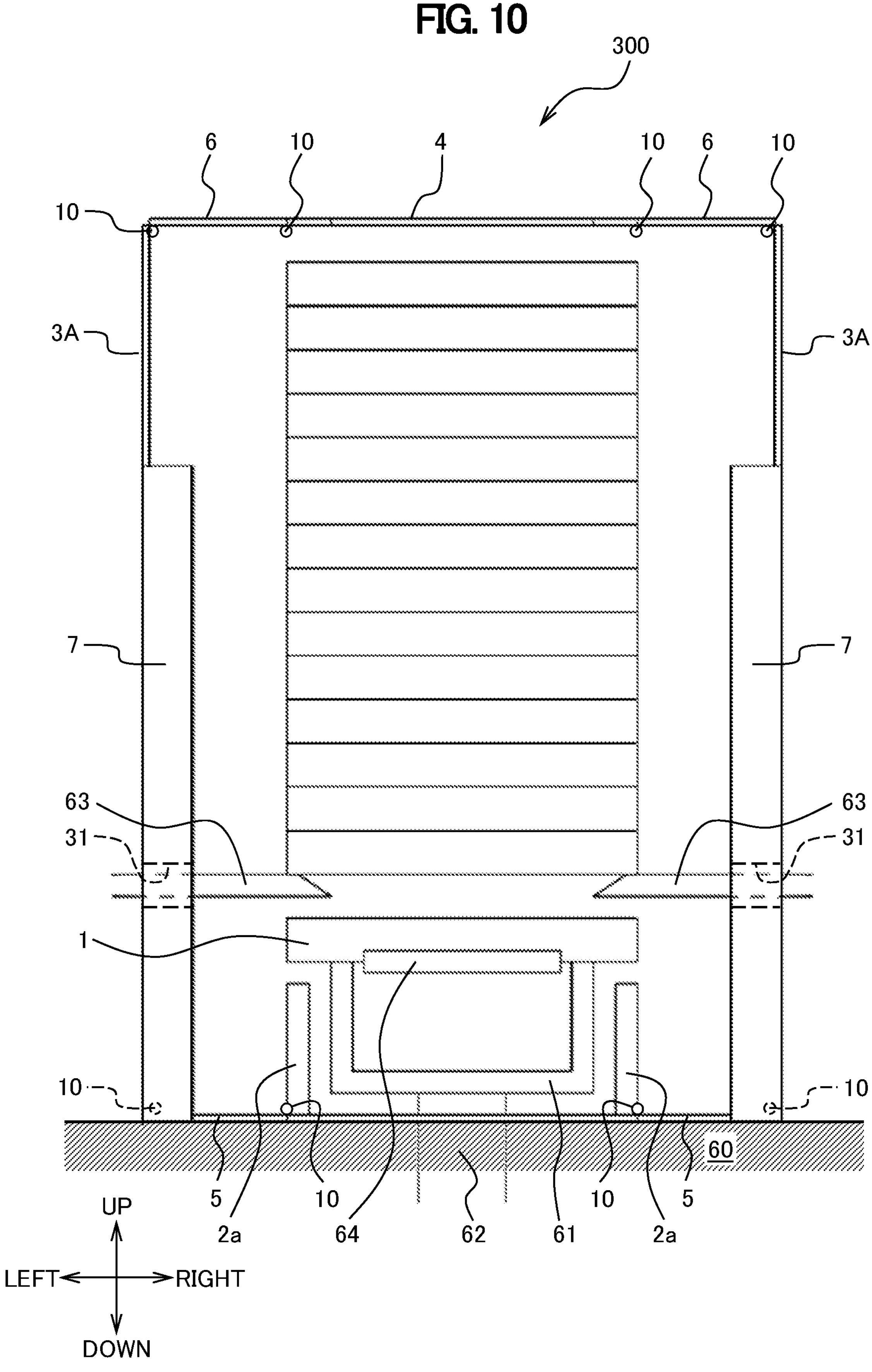
FIG. 10 is a front view of a transport container illustrating an example of a take-out method used for the transport container according to a modification example of the present invention.
Figure 11:
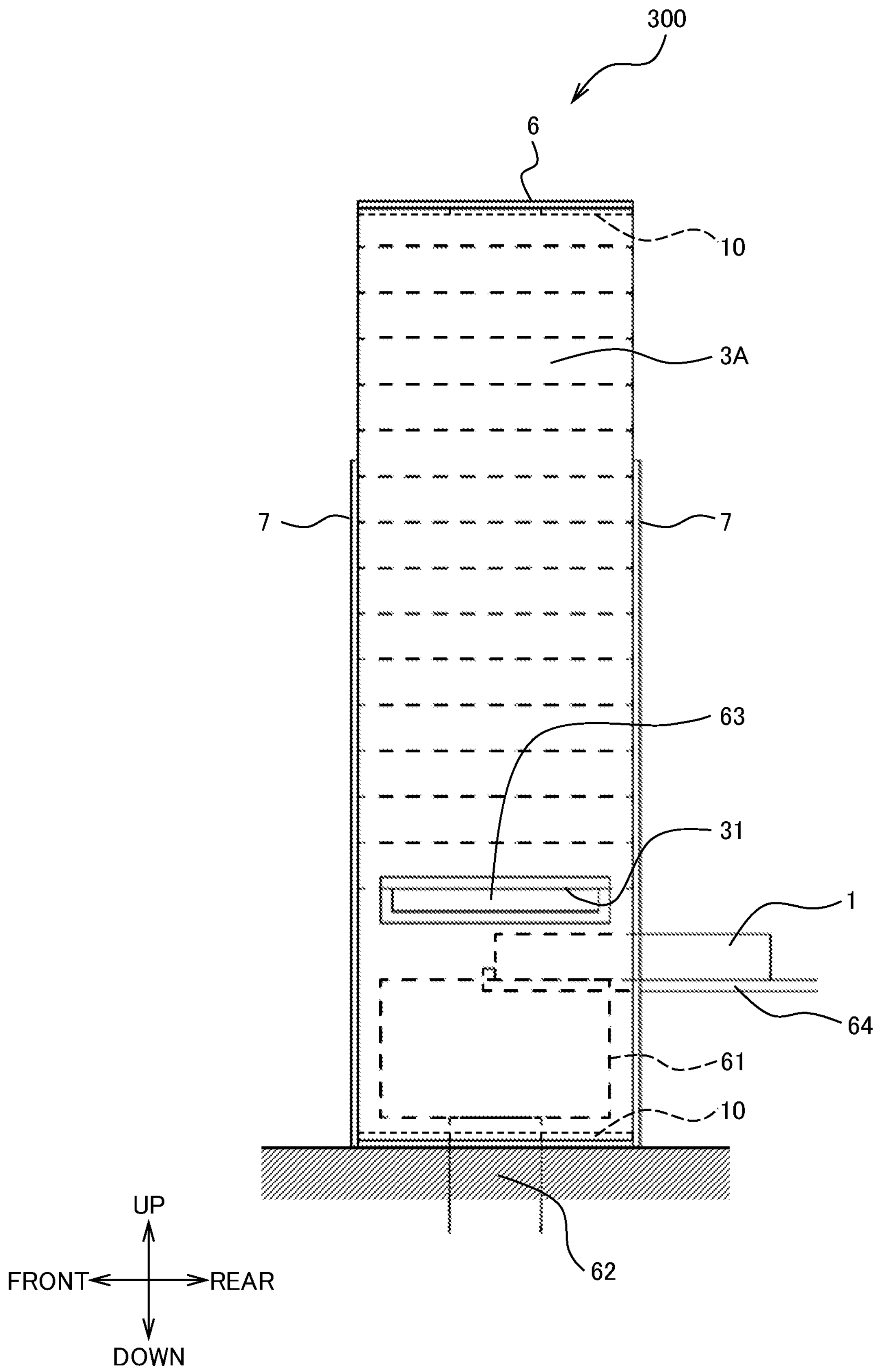
FIG. 11 is a side view of the transport container illustrating an example of the take-out method used for the transport container according to the modification example of the present invention.

FIG. 10 is a front view of a transport container illustrating an example of a take-out method used for the transport container according to a modification example of the present invention. FIG. 11 is a side view of the transport container illustrating an example of the take-out method used for the transport container according to the modification example of the present invention.

FIGS. 10 and 11 illustrate a method for individually taking out transported objects stacked in the up-down direction and accommodated in a transport container 300 from the lower stage side at a substantially horizontal take-out location.

In the transport container 300, the through holes 31 are provided at a predetermined height in the left and right side members 3A. The left and right through holes 31 are provided so as to be positioned near the second stage from the bottom higher than the upper end of the bottom member 2*a* and the transported object on the lowest stage when the handle member 4 is not lifted.

In the take-out method illustrated in FIGS. 10 and 11, first, with the transported objects stacked in the up-down direction and accommodated, the transport container 300 is installed at a substantially horizontal take-out location 60 such that the left and right lower connecting members 5 and the left and right upper connecting members 6 are laid to be non-parallel to the left and right side members 3A. The openings in the front and rear portions of the transport container 300 are widened to the left and right to the maximum extent, and thus the space above the bottom member 2*a* is opened wide.

Subsequently, the entire transported object placed on the bottom member 2*a* is lifted by the movable stage 61 up to a height at which the fork 63 can be inserted through the through hole 31 between the transported object on the lowest stage and the transported object on the second stage from the bottom. It should be noted that this operation may not be performed in a case where the height of the through hole 31 is appropriately designed in advance in accordance with the height of the transported object. In a case where this operation is not performed, the substantially rectangular parallelepiped bottom member 2 (see, for example, FIG. 2) may be used instead of the pedestal-shaped bottom member 2*a*.

Subsequently, the fork 63 is inserted through the through hole 31 between the transported object on the lowest stage and the transported object on the second stage from the bottom, and the transported objects on the second and subsequent stages are lifted by the fork 63. By lifting the transported objects on the second and subsequent stages stacked on the transported object on the lowest stage, the transported object on the lowest stage can be individually put in and taken out in the front-rear direction of the transport container 300.

It should be noted that although the fork 63 in FIG. 10 is provided in an inclined shape such that the base end side is high in side view, the shape and mechanism of the transported object lifting and lowering means are not particularly limited insofar as the transported object can be lifted through the through hole 31. In addition, the transported object lifting and lowering means itself may lift the transported object by moving up and down.

Subsequently, the drawer 64 is inserted below the transported object on the lowest stage, and the transported object on the lowest stage is taken out from between the left and right side members 3A. Although the drawer 64 in FIG. 11 is configured to be inserted from the rear of the transport container 300 to pull out the transported object to the rear, the drawer 64 may be configured to be inserted from the front of the transport container 300 to pull out the transported object to the front.

In addition, although the drawer 64 in FIG. 11 is provided in a claw shape with the tip side bent upward in side view, the shape and mechanism of the transported object take-out means are not particularly limited insofar as the transported object can be taken out in a substantially horizontal direction. The transported object take-out means may be a mechanism pulling out a transported object or may be a mechanism pushing out a transported object onto a tray or the like.

After the transported object on the lowest stage is taken out, the fork 63 is extracted to the outside, and the transported object on the second stage from the bottom is placed on the bottom member 2*a*. Then, the process of taking out the transported object on the lowest stage is repeated with the transported object on the second stage from the bottom having become the transported object on the lowest stage. The transported object taken out of the transport container 300 can be individually transported to a target location.

With the transport container 300 and the transport method described above, since the transported object lifting and lowering means and the transported object take-out means are used, the transported objects stacked in the up-down direction and accommodated in the transport container can be taken out automatically and individually. The stacked and accommodated transported objects can be individually taken out simply by installing the transport container at a predetermined take-out location, and thus manual work-attributable risks and labor can be reduced.

In addition, using the transport container and the transport method, the transported objects stacked in the up-down direction and accommodated in the transport container can be taken out from the lower stage side. As for the movable stage 61 and the stage lift 62 in a case where the objects are taken out from the lower stage side, devices that are small to the extent of aligning the height of the transported object are sufficient. In a case where the height of the through hole 31 is appropriately designed in advance in accordance with the height of the transported object, installation of the movable stage 61 and the stage lift 62 can be omitted. Accordingly, the autoloader can be provided in a simple structure and cost suppression can be achieved.

Figure 12:
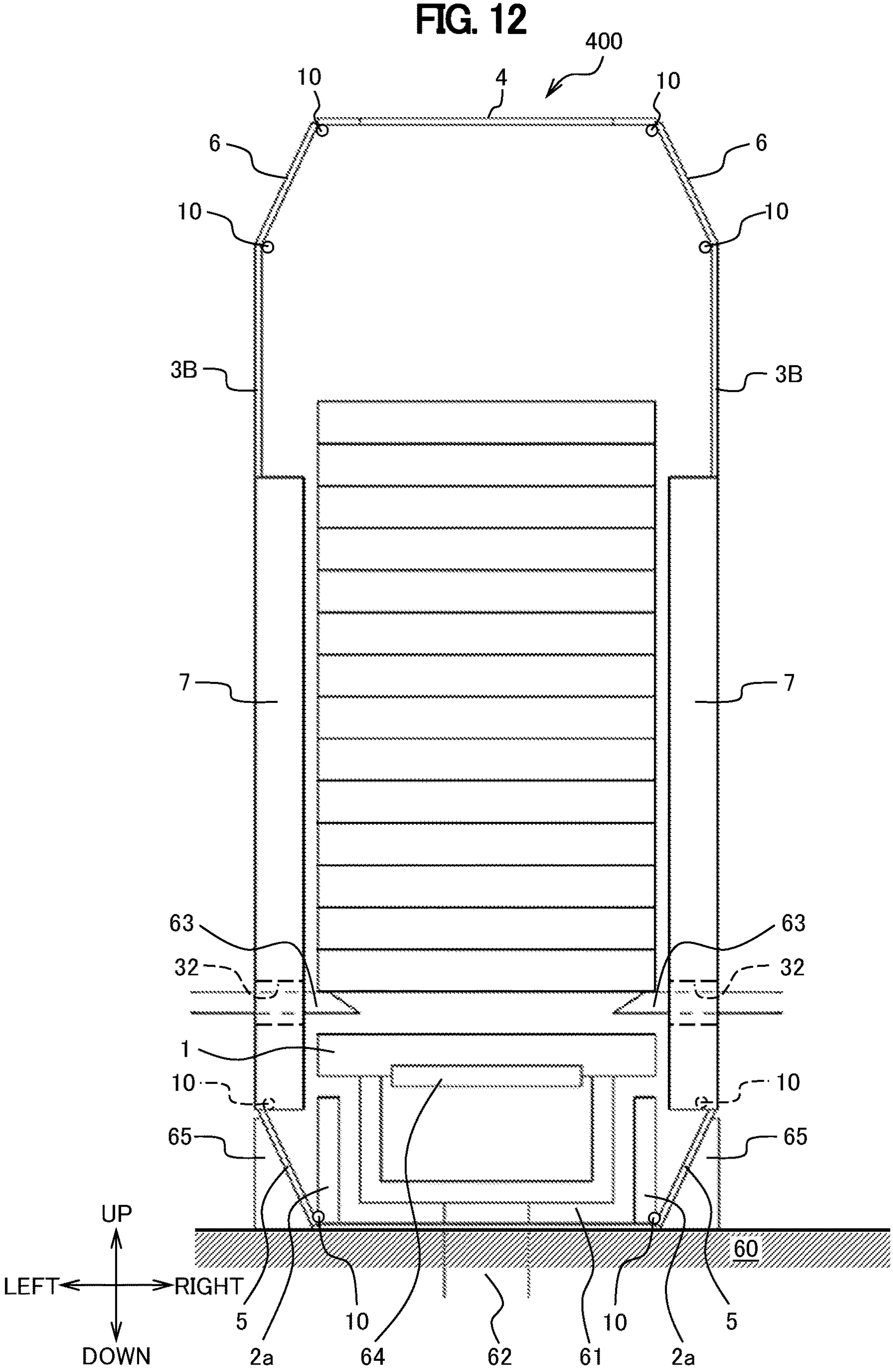
FIG. 12 is a front view of the transport container illustrating an example of the take-out method used for the transport container according to a modification example of the present invention.
Figure 13:
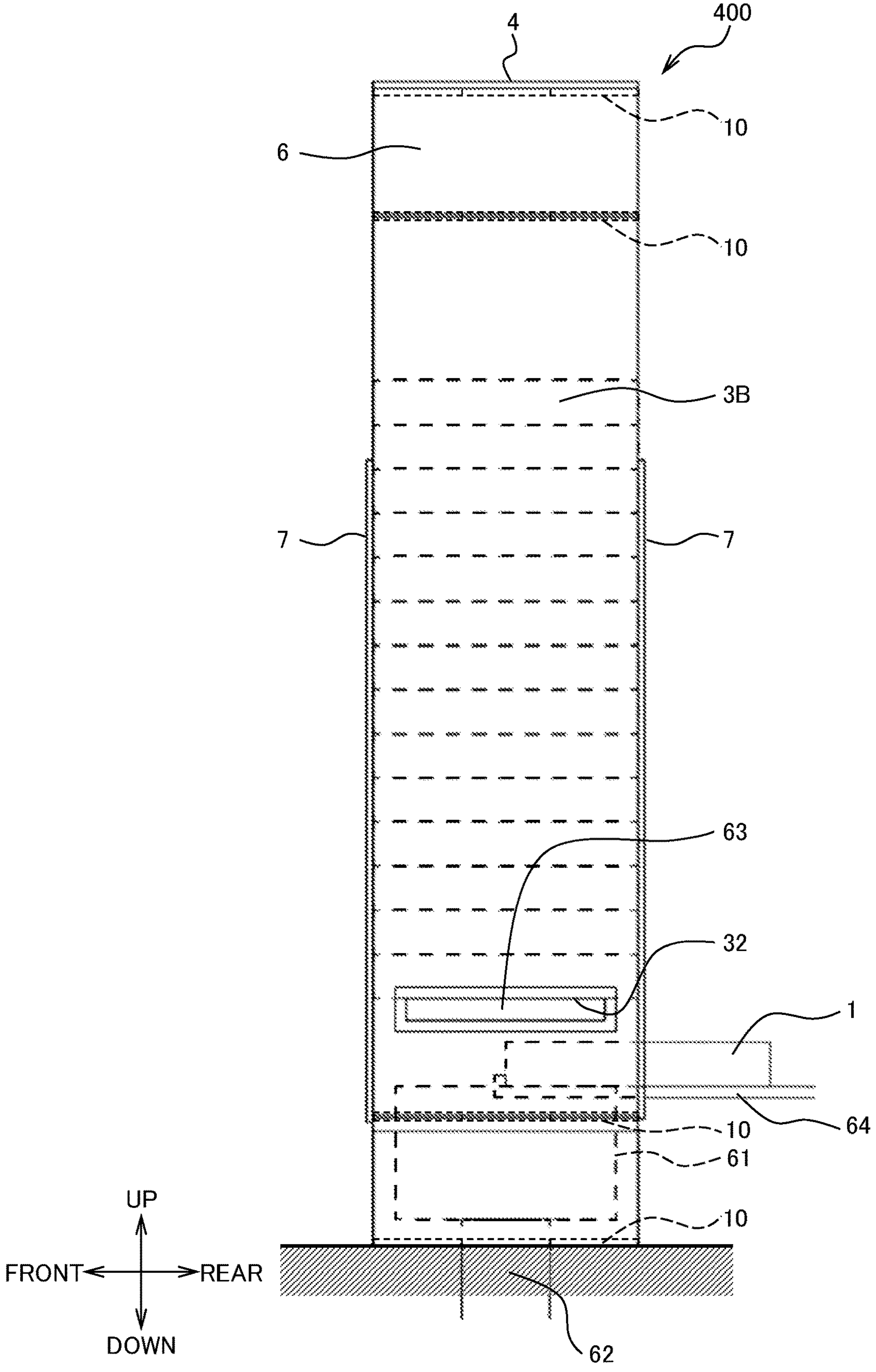
FIG. 13 is a side view of the transport container illustrating an example of the take-out method used for the transport container according to the modification example of the present invention.

FIG. 12 is a front view of a transport container illustrating an example of a take-out method used for the transport container according to a modification example of the present invention. FIG. 13 is a side view of the transport container illustrating an example of the take-out method used for the transport container according to the modification example of the present invention.

FIGS. 12 and 13 illustrate a method for individually taking out transported objects stacked in the up-down direction and accommodated in a transport container 400 from the lower stage side at a take-out location provided with an inclined guide.

In the transport container 400, the through holes 32 are provided at a predetermined height in the left and right side members 3B. The left and right through holes 32 are provided so as to be positioned lower than the transported object on the lowest stage when the handle member 4 is not lifted and positioned near the second stage from the bottom higher than the transported object on the lowest stage when the handle member 4 is lifted up to a medium height, that is, when the left and right lower connecting members 5 and the left and right upper connecting members 6 are inclined and non-parallel to the left and right side members 3B.

In the take-out method illustrated in FIGS. 12 and 13, first, with the transported objects stacked in the up-down direction and accommodated, the transport container 400 is installed at the take-out location 60 provided with inclined guides 65 such that the left and right lower connecting members 5 and the left and right upper connecting members 6 are inclined and non-parallel to the left and right side members 3B, and the transported object on the lowest stage is exposed from between the left and right side members 3B. The openings in the front and rear portions of the transport container 400 are moderately widened to the left and right to the extent that the front and rear surfaces of the transported objects are not covered with the ribs 7, and thus the width as a whole is suppressed in accordance with the angle of inclination although the space above the bottom member 2*a* is opened.

The upper surfaces of the inclined guides 65 are inclined, and the inclined guides 65 are fixed to the left and right of the take-out location 60 in bilateral symmetry such that the outer sides are high. The inclined guides 65 are disposed at an interval approximately equal to the length of the bottom member 2*a* in the left-right direction such that the inclined upper surfaces come into surface contact with the left and right lower connecting members 5.

The angle of inclination of the inclined guide 65 is not particularly limited insofar as the front and rear surfaces of the transported object are not covered with the ribs 7 when the transport container 400 is installed. The angle of inclination of the inclined guide 65 is preferably 45 degrees or more, more preferably 60 degrees or more, and even more preferably 75 degrees or more from the viewpoint of reducing the footprint of the transport container 400.

Subsequently, the entire transported object placed on the bottom member 2*a* is lifted by the movable stage 61 up to a height at which the fork 63 can be inserted through the through hole 32 between the transported object on the lowest stage and the transported object on the second stage from the bottom. It should be noted that this operation may not be performed in a case where the height of the through hole 32 is appropriately designed in advance in accordance with the height of the transported object. In a case where this operation is not performed, the substantially rectangular parallelepiped bottom member 2 (see, for example, FIG. 2) may be used instead of the pedestal-shaped bottom member 2*a*.

Subsequently, the fork 63 is inserted through the through hole 32 between the transported object on the lowest stage and the transported object on the second stage from the bottom, and the transported objects on the second and subsequent stages are lifted by the fork 63. By lifting the transported objects on the second and subsequent stages stacked on the transported object on the lowest stage, the transported object on the lowest stage can be individually put in and taken out in the front-rear direction of the transport container 400.

Subsequently, the drawer 64 is inserted below the transported object on the lowest stage, and the transported object on the lowest stage is taken out from between the left and right side members 3B. Although the drawer 64 in FIG. 13 is configured to be inserted from the rear of the transport container 400 to pull out the transported object to the rear, the drawer 64 may be configured to be inserted from the front of the transport container 400 to pull out the transported object to the front.

After the transported object on the lowest stage is taken out, the fork 63 is extracted to the outside, and the transported object on the second stage from the bottom is placed on the bottom member 2*a*. Then, the process of taking out the transported object on the lowest stage is repeated with the transported object on the second stage from the bottom having become the transported object on the lowest stage. The transported object taken out of the transport container 400 can be individually transported to a target location.

With the transport container 400 and the transport method described above, since the transported object lifting and lowering means and the transported object take-out means are used, the transported objects stacked in the up-down direction and accommodated in the transport container can be taken out automatically and individually. The left and right lower connecting members 5 and the left and right upper connecting members 6 are inclined to be non-parallel to the left and right side members 3B simply by installing the transport container at a take-out location provided with a predetermined inclined guide, and thus manual work-attributable risks and labor can be reduced. In addition, the transported object can be taken out by narrowing the openings on the front and rear sides of the transport container 400, and thus the footprint of the transport container 400 during unloading can be reduced as compared with the case of the transport container 300.

Figure 14:
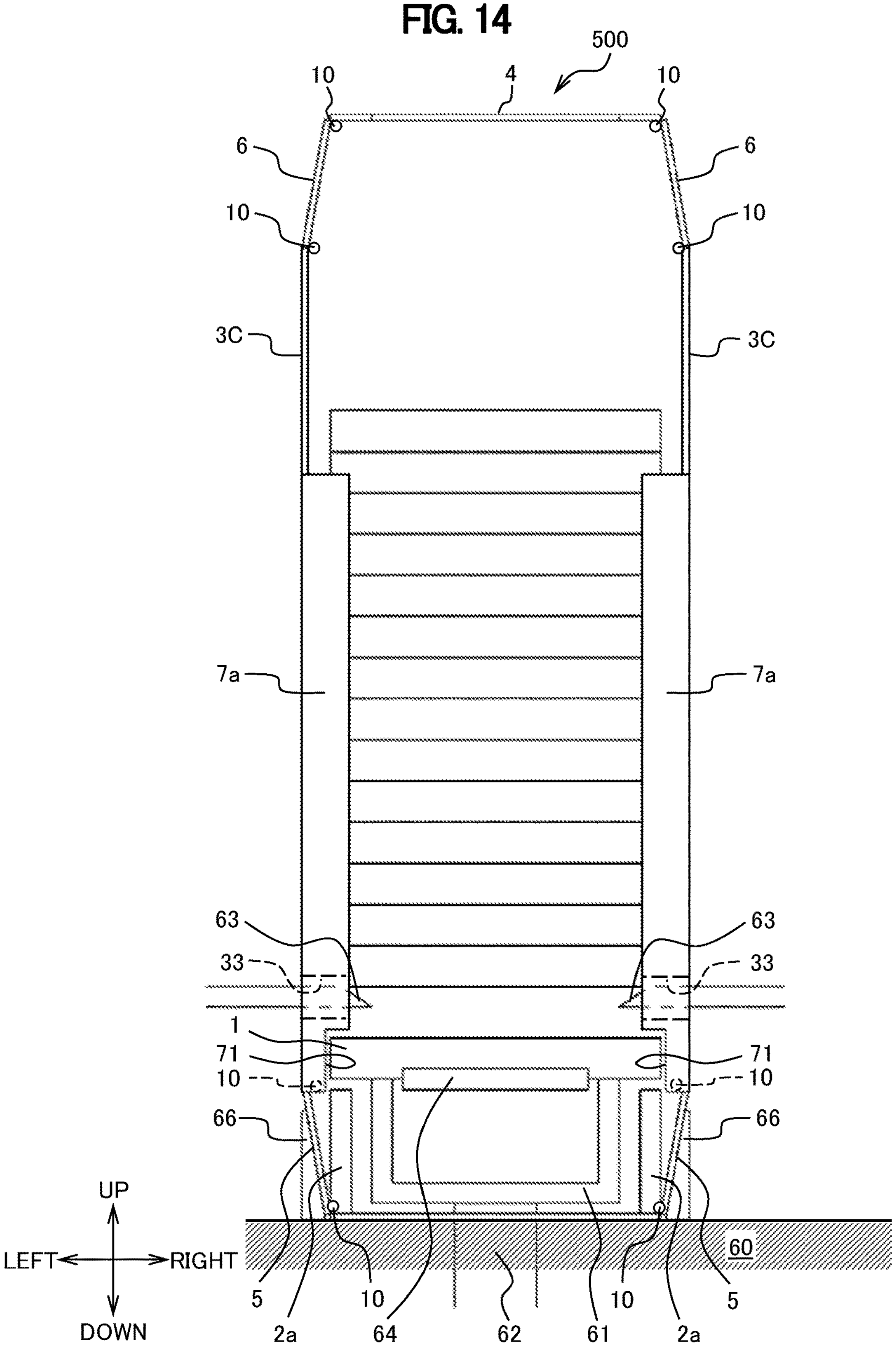
FIG. 14 is a front view of the transport container illustrating an example of the take-out method used for the transport container according to a modification example of the present invention.
Figure 15:
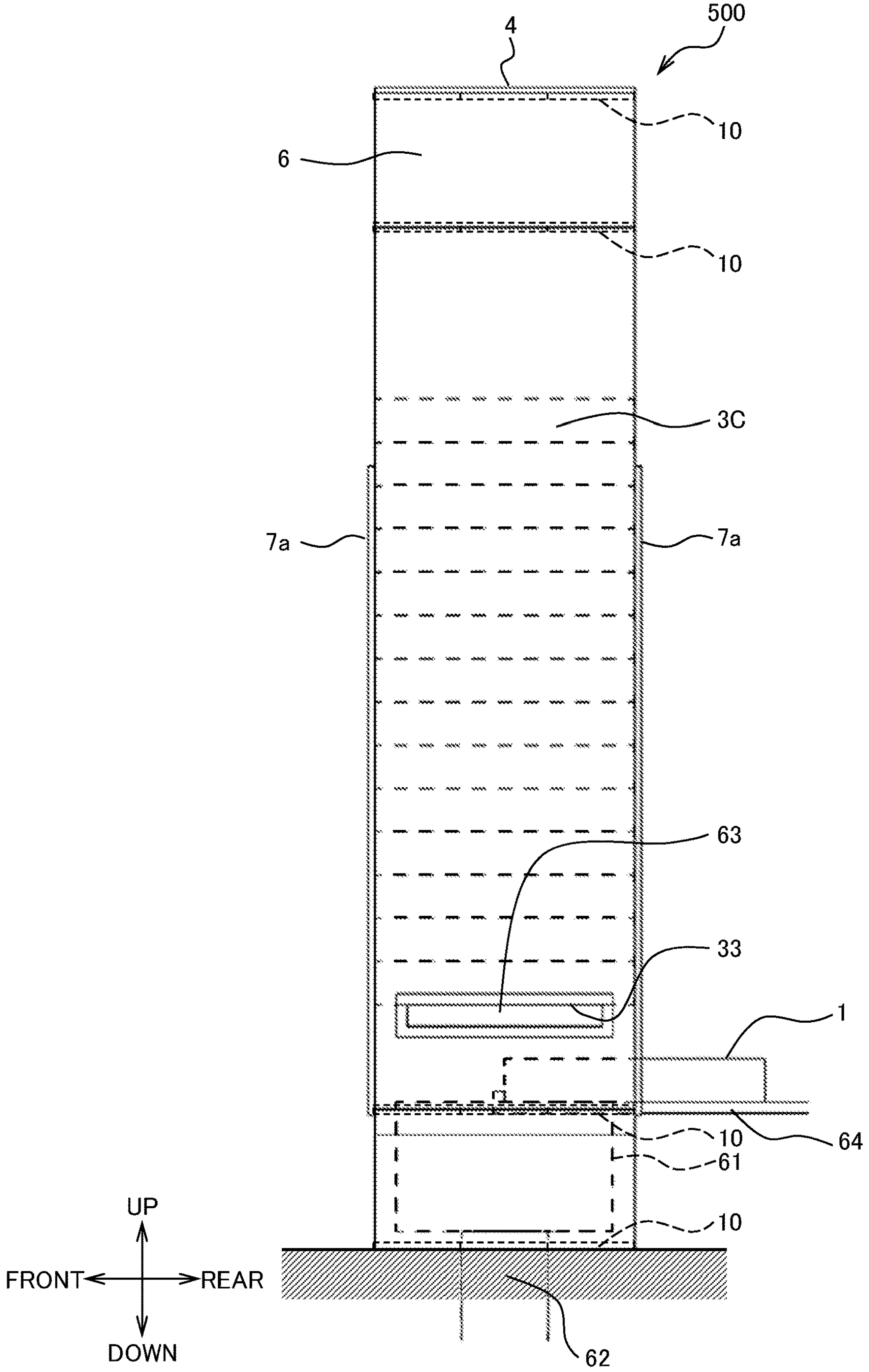
FIG. 15 is a side view of the transport container illustrating an example of the take-out method used for the transport container according to the modification example of the present invention.

FIG. 14 is a front view of a transport container illustrating an example of a take-out method used for the transport container according to a modification example of the present invention. FIG. 15 is a side view of the transport container illustrating an example of the take-out method used for the transport container according to the modification example of the present invention.

FIGS. 14 and 15 illustrate a method for individually taking out transported objects stacked in the up-down direction and accommodated in a transport container 500 from the lower stage side at a take-out location provided with an inclined guide.

In the transport container 500, the through holes 33 are provided at a predetermined height in the left and right side members 3C. The left and right through holes 33 are provided so as to be positioned lower than the transported object on the lowest stage when the handle member 4 is not lifted and positioned near the second stage from the bottom higher than the transported object on the lowest stage when the handle member 4 is lifted up to a height slightly lower than the maximum, that is, when the left and right lower connecting members 5 and the left and right upper connecting members 6 are inclined and almost parallel to the left and right side members 3C.

In addition, ribs 7*a* provided on the left and right side members 3C are provided with notch portions 71 in the lower end portions thereof, and each rib 7*a* has a shape in which the inside of the lower end portion in the left-right direction is notched. The left and right ribs 7*a* have a shape in which the transported object on the lowest stage is exposed from the parts where the ribs 7*a* are notched between the left and right side members 3C when the handle member 4 is lifted up to a height slightly lower than the maximum. When the handle member 4 is lifted up to the maximum height, the transported object on the lowest stage is covered with the outside of the notch portion 71. Meanwhile, when the handle member 4 is lifted up to a height slightly lower than the maximum, the transported objects on the second and subsequent stages from the bottom are covered with the ribs 7*a*.

In the take-out method illustrated in FIGS. 14 and 15, first, with the transported objects stacked in the up-down direction and accommodated, the transport container 500 is installed at the take-out location 60 provided with inclined guides 66 such that the left and right lower connecting members 5 and the left and right upper connecting members 6 are inclined and non-parallel to the left and right side members 3C, and the transported object on the lowest stage is exposed from the parts where the ribs 7*a* are notched between the left and right side members 3C. The openings in the front and rear portions of the transport container 500 are narrowed on the left and right in accordance with the width of the notch portions 71, and thus the front and rear surfaces of the transported object on the second stage from the bottom are covered with the ribs 7*a* although the front and rear surfaces of the transported object on the lowest stage are not covered with the ribs 7*a*, and the width as a whole is suppressed in accordance with the angle of inclination and the width of the notch portions 71.

The upper surfaces of the inclined guides 66 are inclined, and the inclined guides 66 are fixed to the left and right of the take-out location 60 in bilateral symmetry such that the outer sides are high. The inclined guides 66 are disposed at an interval approximately equal to the length of the bottom member 2*a* in the left-right direction such that the inclined upper surfaces come into surface contact with the left and right lower connecting members 5.

The angle of inclination of the inclined guide 66 is not particularly limited insofar as the front and rear surfaces of the transported object on the lowest stage are not covered with the ribs 7*a* when the transport container 500 is installed. The angle of inclination of the inclined guide 66 is preferably 45 degrees or more, more preferably 60 degrees or more, and even more preferably 75 degrees or more from the viewpoint of reducing the footprint of the transport container 500.

Subsequently, as in the case of the transport container 400 described above, if necessary, the entire transported object placed on the bottom member 2*a* is lifted by the movable stage 61. Next, the transported objects on the second and subsequent stages are lifted by the fork 63. Then, after the transported objects on the second and subsequent stages are lifted, the drawer 64 is inserted below the transported object on the lowest stage, and the transported object on the lowest stage is taken out of the parts where the ribs 7*a* are notched between the left and right side members 3C. In the subsequent process, the process of taking out the transported object on the lowest stage is repeated with the transported object on the second stage from the bottom having become the transported object on the lowest stage.

With the transport container 500 and the transport method described above, since the transported object lifting and lowering means and the transported object take-out means are used, the transported objects stacked in the up-down direction and accommodated in the transport container can be taken out automatically and individually. The left and right lower connecting members 5 and the left and right upper connecting members 6 are inclined to be non-parallel to the left and right side members 3C simply by installing the transport container at a take-out location provided with a predetermined inclined guide, and thus manual work-attributable risks and labor can be reduced. In addition, the notch portion 71 is provided in the lower end portion of the rib 7*a*, the transported object can be taken out by narrowing the openings on the front and rear sides of the transport container 500, and thus the footprint of the transport container 500 during unloading can be further reduced as compared with the case of the transport container 400. In addition, during unloading, the ribs 7*a* are capable of continuing to support the front and rear sides of the transported objects on the second and subsequent stages from the bottom.

Figure 16:
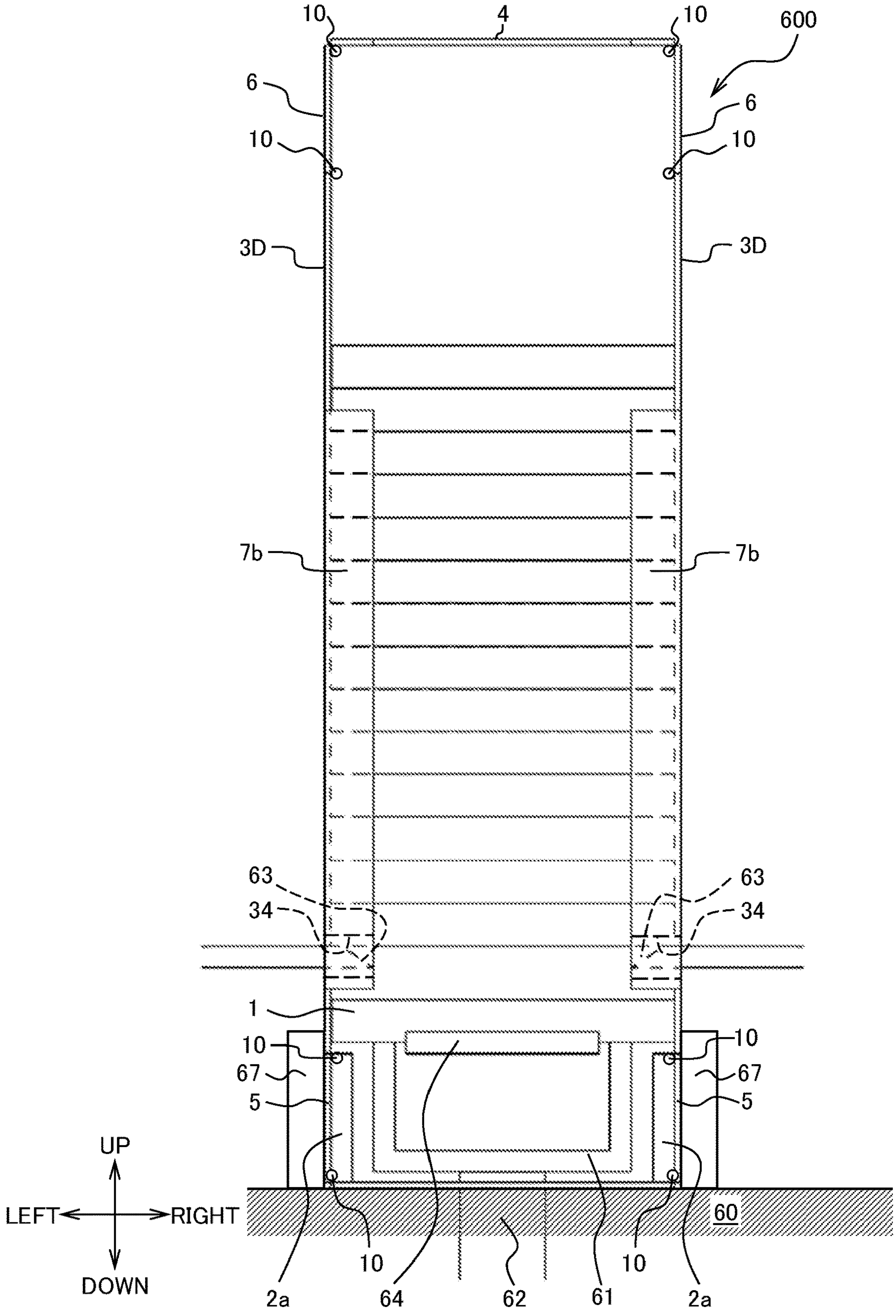
FIG. 16 is a front view of the transport container illustrating an example of the take-out method used for the transport container according to a modification example of the present invention.
Figure 17:
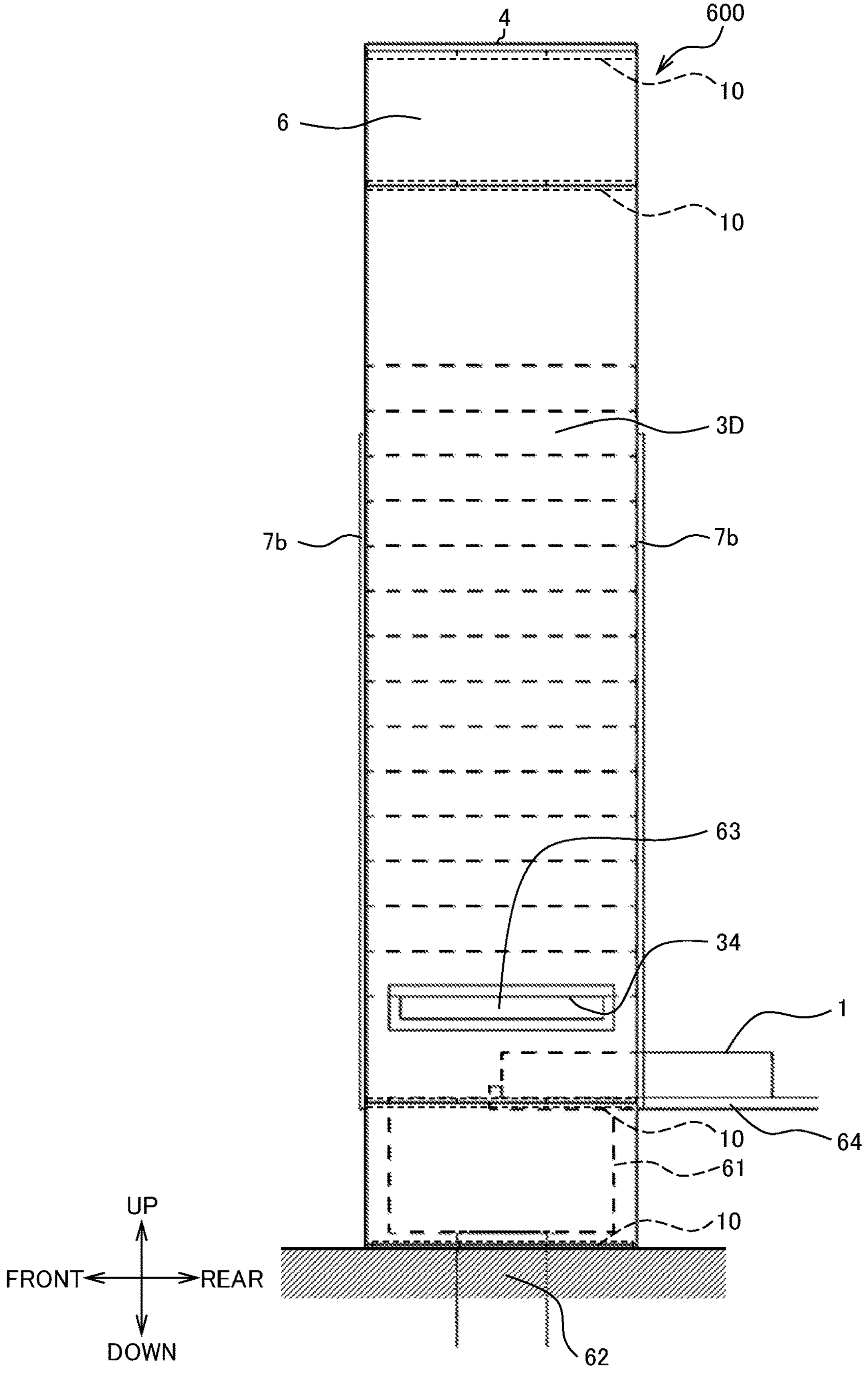
FIG. 17 is a side view of the transport container illustrating an example of the take-out method used for the transport container according to the modification example of the present invention.

FIG. 16 is a front view of a transport container illustrating an example of a take-out method used for the transport container according to a modification example of the present invention. FIG. 17 is a side view of the transport container illustrating an example of the take-out method used for the transport container according to the modification example of the present invention.

FIGS. 16 and 17 illustrate a method for individually taking out transported objects stacked in the up-down direction and accommodated in a transport container 600 from the lower stage side at a take-out location provided with a vertical guide. Transported objects mutually fittable on the upper and lower surface sides thereof and having fixed relative positions in the horizontal direction in a state of being mutually stacked are used as the transported objects in this method.

In the transport container 600, the through holes 34 are provided at a predetermined height in the left and right side members 3D. The left and right through holes 34 are provided so as to be positioned lower than the transported object on the lowest stage when the handle member 4 is not lifted and when the handle member 4 is lifted up to a medium height and positioned near the second stage from the bottom higher than the transported object on the lowest stage when the handle member 4 is lifted up to the maximum height, that is, when the left and right lower connecting members 5 and the left and right upper connecting members 6 are upright and substantially parallel to the left and right side members 3D.

In addition, ribs 7*b* provided on the left and right side members 3D have a length at which the lower end portions of the ribs 7*b* are positioned above the upper end of the bottom member 2*a* when the handle member 4 is lifted. The left and right ribs 7*b* are provided such that the transported object on the lowest stage is exposed from below the ribs 7*b* between the left and right side members 3D when the handle member 4 is lifted up to the maximum height.

In the take-out method illustrated in FIGS. 16 and 17, first, with the transported objects stacked in the up-down direction and accommodated, the transport container 600 is installed at the take-out location 60 provided with vertical guides 67 such that the left and right lower connecting members 5 and the left and right upper connecting members 6 are upright and substantially parallel to the left and right side members 3D, and the transported object on the lowest stage is exposed from below the ribs 7*b* between the left and right side members 3D. The openings in the front and rear portions of the transport container 600 are narrowed on the left and right, and thus the width as a whole is suppressed.

The vertical guides 67 have substantially vertical inside surfaces and are fixed to the left and right of the take-out location 60 so as to face each other. The vertical guides 67 are disposed at an interval approximately equal to the length of the bottom member 2*a* in the left-right direction such that the substantially vertical inside surfaces come into surface contact with the left and right lower connecting members 5.

Subsequently, as in the case of the transport container 400 described above, if necessary, the entire transported object placed on the bottom member 2*a* is lifted by the movable stage 61. Next, the transported objects on the second and subsequent stages are lifted by the fork 63. The transported objects on the second and subsequent stages are lifted up to a height at which the fitting with respect to the transported object on the lowest stage is released. Then, after the transported objects on the second and subsequent stages are lifted, the drawer 64 is inserted below the transported object on the lowest stage, and the transported object on the lowest stage is taken out from below the ribs 7*b* between the left and right side members 3D. In the subsequent process, the process of taking out the transported object on the lowest stage is repeated with the transported object on the second stage from the bottom having become the transported object on the lowest stage.

With the transport container 600 and the transport method described above, since the transported object lifting and lowering means and the transported object take-out means are used, the transported objects stacked in the up-down direction and accommodated in the transport container can be taken out automatically and individually. Even with the handle member 4 released, the left and right lower connecting members 5 and the left and right upper connecting members 6 become upright to be substantially parallel to the left and right side members 3D simply by installing the transport container at a take-out location provided with a predetermined vertical guide, and thus manual work-attributable risks and labor can be reduced. In addition, the ribs 7*b* are open below, the transported object can be taken out by narrowing the openings on the front and rear sides of the transport container 600, and thus the footprint of the transport container 600 during unloading can be further reduced as compared with the case of the transport container 500. In addition, during unloading, the ribs 7*b* are capable of continuing to support the front and rear sides of the transported objects on the second and subsequent stages from the bottom. The transported object on the lowest stage is fitted to the transported objects on the second and subsequent stages supported on the front and rear sides as described above, and thus the transported object on the lowest stage is unlikely to be misaligned in the front-rear direction below the ribs 7*b*.

FIGS. 18 to 21 illustrate methods for individually taking out, from the upper stage side, transported objects stacked in the up-down direction and accommodated in the transport container.

In FIGS. 18 to 21, the autoloader includes a movable stage (transported object lifting and lowering means) 61*a* for lifting the entire transported objects placed on the bottom member 2*a*, the stage lift 62 moving the movable stage 61*a* up and down, and a roller-type loader (transported object take-out means) 80 drawing out a transported object in the horizontal direction. Unlike the movable stage 61 illustrated in FIGS. 10 to 17, the movable stage 61*a* does not have a penetration structure of penetration in the front-rear direction for inserting the drawer 64 and is provided as a flat plate-shaped pedestal.

The roller-type loader 80 includes a roller 81 moving a transported object in contact by rotation-attributable friction, a drive shaft 82 driving the rotational motion of the roller 81, and a movable member 83 moving the roller 81 forward and backward with respect to the space above the bottom member 2*a*. Below the roller-type loader 80, a movable tray 84 for receiving a transported object pulled out by the roller 81 is provided so as to be capable of moving forward and backward with respect to the space above the bottom member 2*a*.

In the transport container illustrated in FIGS. 18 to 21, a pedestal-shaped bottom member 2*b* is provided in the bottom portion of the transport container instead of the substantially rectangular parallelepiped bottom member 2 (see, for example, FIG. 2). The pedestal-shaped bottom member 2*b* is provided in a frame-shaped structure supporting only the outer edge portion of the lower surface of the transported object in the left-right direction. The pedestal-shaped bottom member 2*b* has a penetration structure of penetration in the up-down direction for inserting the movable stage 61*a* from below the transported object placed on the bottom member 2*b*. However, unlike the bottom member 2*a* described above, the pedestal-shaped bottom member 2*b* may not have a penetration structure of penetration in the front-rear direction.

In addition, in the transport container illustrated in FIGS. 18 to 21, the left and right side portions of the transport container are provided with side members 3E and 3F having ribs 7*c* and 7*d* with a predetermined shape instead of the side members 3 (see, for example, FIG. 1).

Figure 18:
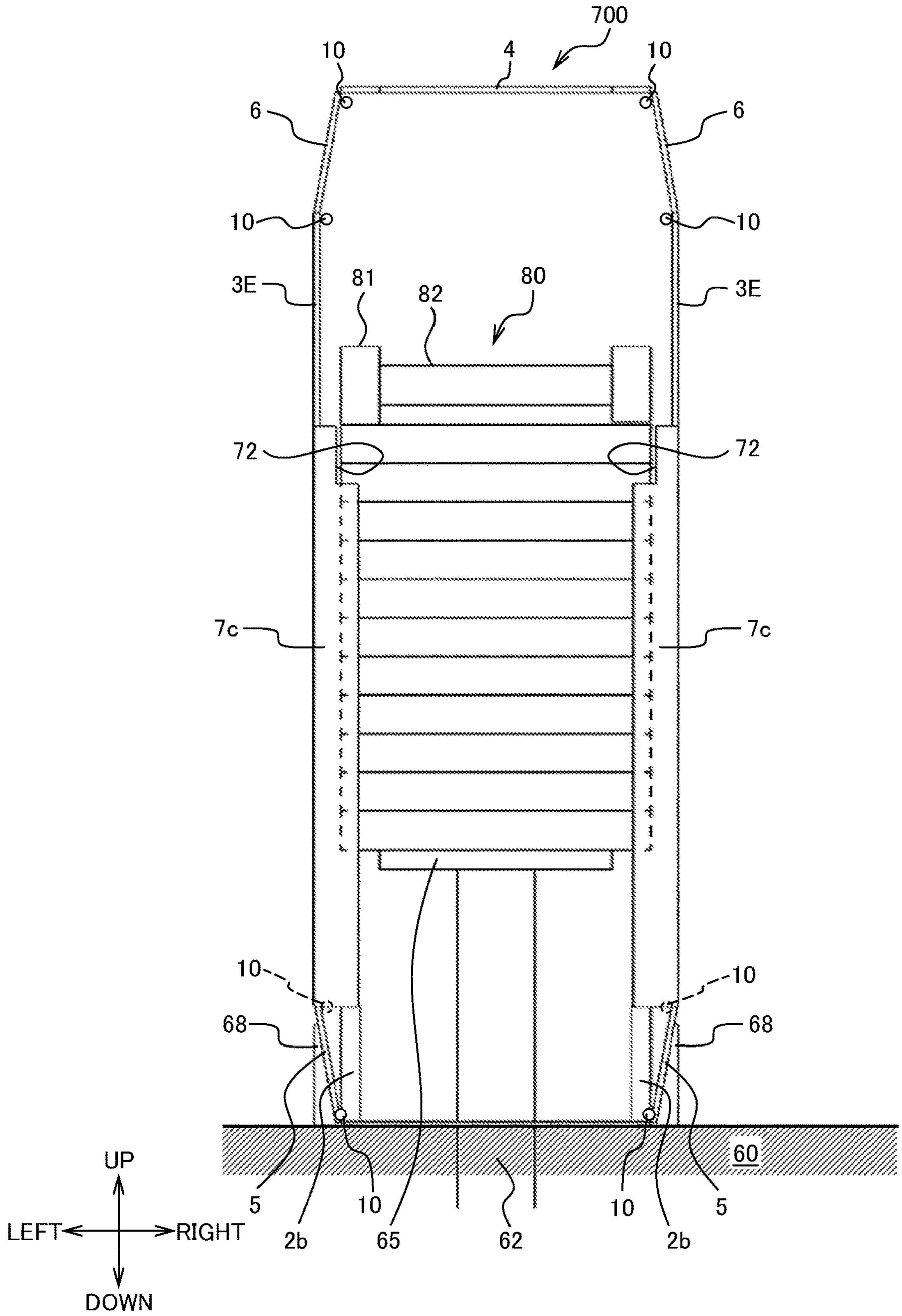
FIG. 18 is a front view of the transport container illustrating an example of the take-out method used for the transport container according to a modification example of the present invention.
Figure 19:
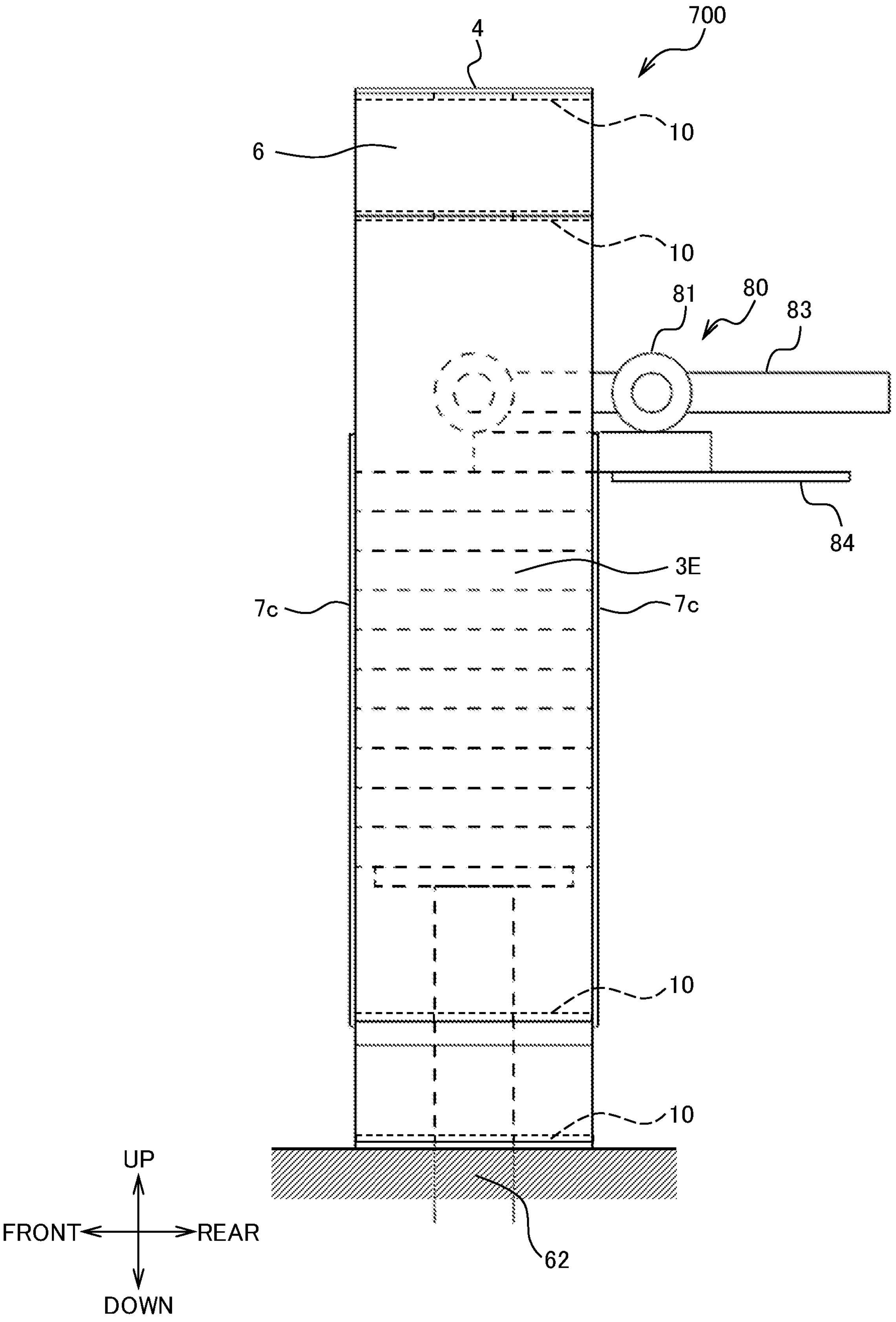
FIG. 19 is a side view of the transport container illustrating an example of the take-out method used for the transport container according to the modification example of the present invention.

FIG. 18 is a front view of a transport container illustrating an example of a take-out method used for the transport container according to a modification example of the present invention. FIG. 19 is a side view of the transport container illustrating an example of the take-out method used for the transport container according to the modification example of the present invention.

FIGS. 18 and 19 illustrate a method for individually taking out transported objects stacked in the up-down direction and accommodated in a transport container 700 from the upper stage side at a take-out location provided with an inclined guide.

In the transport container 700, the ribs 7*c* provided on the left and right side members 3E are provided with notch portions 72 in the upper end portions thereof, and each rib 7*c* has a shape in which the inside of the upper end portion in the left-right direction is notched. The left and right ribs 7*c* have a shape in which the transported object on the highest stage is exposed from the parts where the ribs 7*c* are notched between the left and right side members 3E when the handle member 4 is lifted up to a height slightly higher than the minimum. When the handle member 4 is lifted up to the maximum height, the transported object on the highest stage is covered with the outside of the notch portion 72. Meanwhile, when the handle member 4 is lifted up to a height slightly higher than the minimum, the transported objects on the second and subsequent stages from the top are covered with the ribs 7*c*.

In the take-out method illustrated in FIGS. 18 and 19, first, with the transported objects stacked in the up-down direction and accommodated, the transport container 700 is installed at the take-out location 60 provided with inclined guides 68 such that the left and right lower connecting members 5 and the left and right upper connecting members 6 are inclined and non-parallel to the left and right side members 3E. The openings in the front and rear portions of the transport container 700 remain narrow on the left and right in accordance with the width of the notch portions 72, and thus the width as a whole is suppressed in accordance with the angle of inclination and the width of the notch portions 72.

As in the case of the inclined guides 66, the upper surfaces of the inclined guides 68 are inclined, and the inclined guides 68 are fixed to the left and right of the take-out location 60 in bilateral symmetry such that the outer sides are high. The angle of inclination of the inclined guide 68 is preferably 45 degrees or more, more preferably 60 degrees or more, and even more preferably 75 degrees or more from the viewpoint of reducing the footprint of the transport container 700.

Subsequently, the entire transported object placed on the bottom member 2*a* is lifted by the movable stage 61*a* up to a height where the transported object on the highest stage is exposed at the parts where the ribs 7*c* are notched between the left and right side members 3E. By lifting the entire transported object, the transported object on the highest stage can be put in and taken out in the front-rear direction of the transport container 700 from the parts where the ribs 7*c* are notched between the left and right side members 3E.

Subsequently, the roller-type loader 80 is inserted onto the transported object on the highest stage and the roller 81 is rotated to take the transported object on the highest stage out of the parts where the ribs 7*c* are notched between the left and right side members 3E. Although the roller-type loader 80 in FIG. 19 is configured to be inserted from the rear of the transport container 700 to pull out the transported object to the rear, the roller-type loader 80 may be configured to be inserted from the front of the transport container 700 to pull out the transported object to the front.

The roller-type loader 80 is inserted such that the roller 81 supported at the tip of the movable member 83 comes into contact with the upper surface of the transported object on the highest stage. In addition, the movable tray 84 is disposed behind the transported object on the highest stage so as to match the height of the transported object on the highest stage. The rotational motion of the roller 81 that is in contact with the upper surface of the transported object is driven by the drive shaft 82 connected to a motor. The transported object on the highest stage is taken out to the rear by the friction attributable to the rotational motion of the roller 81 and placed on the movable tray 84.

After the transported object on the highest stage is taken out, the entire transported object placed on the bottom member 2*b* is lifted by the movable stage 61*a*. Then, the process of taking out the transported object on the highest stage is repeated with the transported object on the second stage from the top having become the transported object on the highest stage. The transported object taken out of the transport container 700 can be individually transported to a target location.

With the transport container 700 and the transport method described above, since the transported object lifting and lowering means and the transported object take-out means are used, the transported objects stacked in the up-down direction and accommodated in the transport container can be taken out automatically and individually. The left and right lower connecting members 5 and the left and right upper connecting members 6 are inclined to be non-parallel to the left and right side members 3E simply by installing the transport container at a take-out location provided with a predetermined inclined guide, and thus manual work-attributable risks and labor can be reduced. In addition, the notch portion 72 is provided in the upper end portion of the rib 7*c*, the transported object can be taken out by narrowing the openings on the front and rear sides of the transport container 700, and thus the footprint of the transport container 700 during unloading can be reduced. In addition, according to the method for taking out the object from the upper stage side, there is no need to provide through holes in the left and right side members 3E, and thus the transport container 700 can be provided in a simpler structure. In addition, during unloading, the ribs 7*c* are capable of continuing to support the front and rear sides of the transported objects on the second and subsequent stages from the top. Preferably, such a transport method is used for transported objects having unfixed relative positions in the horizontal direction in a state of being mutually stacked in that the transported object on the highest stage can be pulled out in the horizontal direction.

Figure 20:
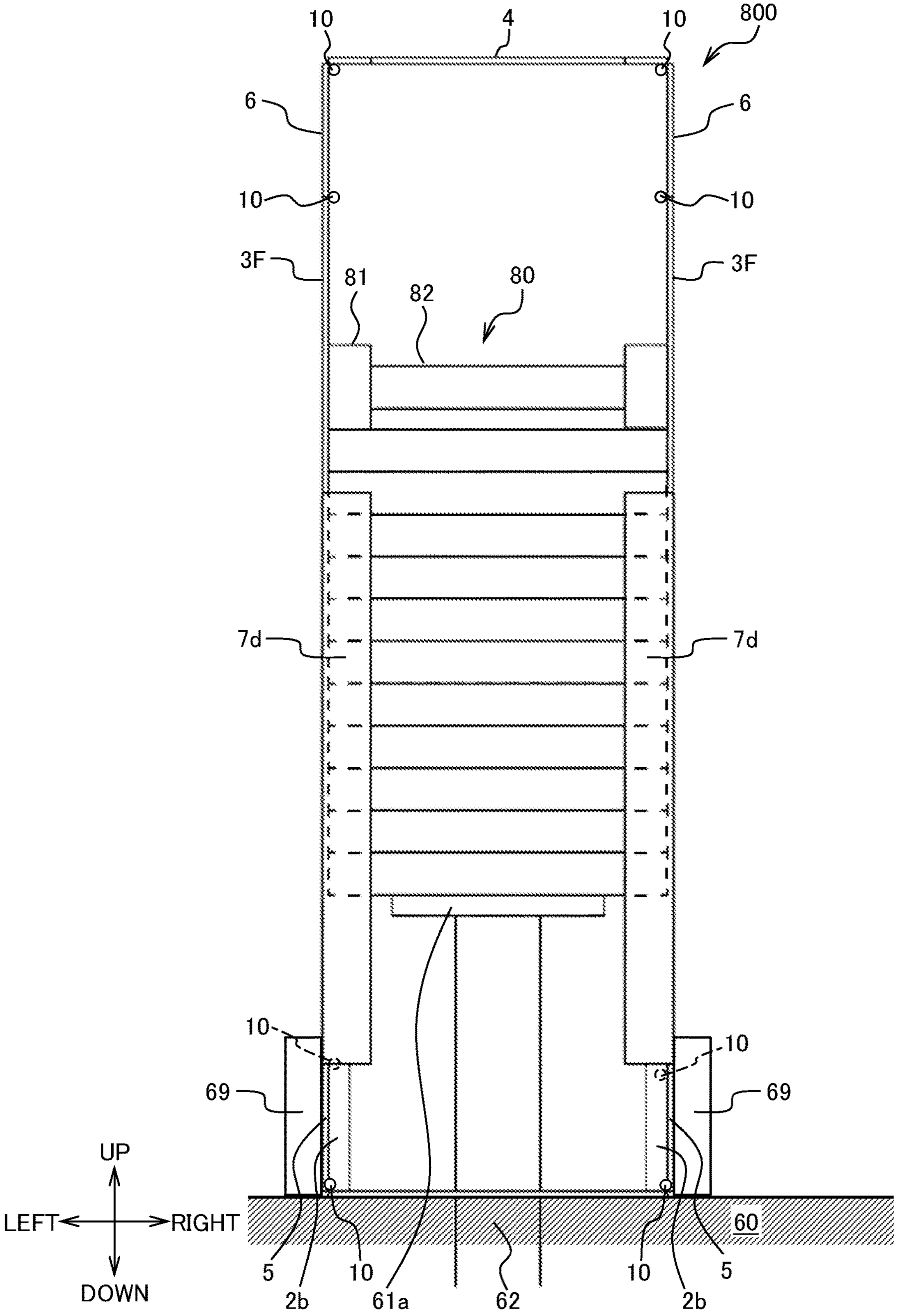
FIG. 20 is a front view of the transport container illustrating an example of the take-out method used for the transport container according to a modification example of the present invention.
Figure 21:
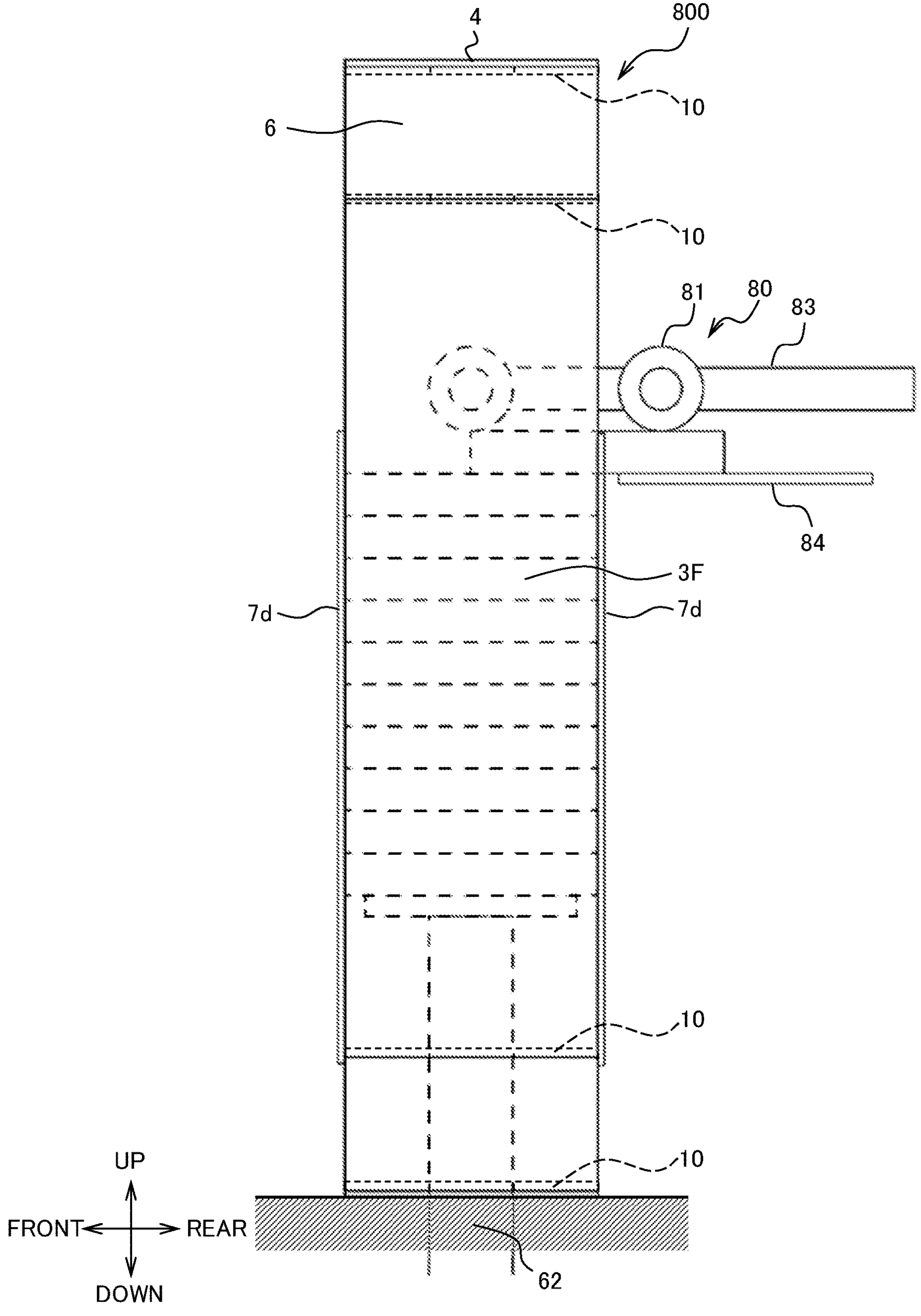
FIG. 21 is a side view of the transport container illustrating an example of the take-out method used for the transport container according to the modification example of the present invention.

FIG. 20 is a front view of a transport container illustrating an example of a take-out method used for the transport container according to a modification example of the present invention. FIG. 21 is a side view of the transport container illustrating an example of the take-out method used for the transport container according to the modification example of the present invention.

FIGS. 20 and 21 illustrate a method for individually taking out transported objects stacked in the up-down direction and accommodated in a transport container 800 from the upper stage side at a take-out location provided with a vertical guide.

In the transport container 800, unlike the ribs 7*c* described above, the ribs 7*d* provided on the left and right side members 3F are not provided with the notch portions 72 in the upper end portions thereof. In addition, unlike the ribs 7*a* described above, the ribs 7*d* are not provided with the notch portions 71 in the lower end portions thereof. In addition, unlike the ribs 7*b* described above, the ribs 7*d* are not provided at a length at which the lower end portions of the ribs 7*d* are positioned above the upper end of the bottom member 2*b* when the handle member 4 is lifted.

In the take-out method illustrated in FIGS. 20 and 21, first, with the transported objects stacked in the up-down direction and accommodated, the transport container 800 is installed at the take-out location 60 provided with vertical guides 69 such that the left and right lower connecting members 5 and the left and right upper connecting members 6 are upright and substantially parallel to the left and right side members 3F. The openings in the front and rear portions of the transport container 800 remain narrow on the left and right, and thus the width as a whole is suppressed.

As in the case of the vertical guides 67 described above, the vertical guides 69 have substantially vertical inside surfaces and are fixed to the left and right of the take-out location 60 so as to face each other. The vertical guides 69 are disposed at an interval approximately equal to the length of the bottom member 2*b* in the left-right direction such that the substantially vertical inside surfaces come into surface contact with the left and right lower connecting members 5.

Subsequently, the entire transported object placed on the bottom member 2*b* is lifted by the movable stage 61*a* up to the height at which the transported object on the highest stage is exposed above the ribs 7*d* between the left and right side members 3F. By lifting the entire transported object, the transported object on the highest stage can be put in and taken out in the front-rear direction of the transport container 800 from above the ribs 7*d* between the left and right side members 3F.

Subsequently, the roller-type loader 80 is inserted onto the transported object on the highest stage and the roller 81 is rotated to take out the transported object on the highest stage from above the ribs 7*d* between the left and right side members 3F. Although the roller-type loader 80 in FIG. 21 is configured to be inserted from the rear of the transport container 800 to pull out the transported object to the rear, the roller-type loader 80 may be configured to be inserted from the front of the transport container 800 to pull out the transported object to the front.

After the transported object on the highest stage is taken out, the entire transported object placed on the bottom member 2*b* is lifted by the movable stage 61*a*. Then, the process of taking out the transported object on the highest stage is repeated with the transported object on the second stage from the top having become the transported object on the highest stage. The transported object taken out of the transport container 800 can be individually transported to a target location.

With the transport container 800 and the transport method described above, since the transported object lifting and lowering means and the transported object take-out means are used, the transported objects stacked in the up-down direction and accommodated in the transport container can be taken out automatically and individually. Even with the handle member 4 released, the left and right lower connecting members 5 and the left and right upper connecting members 6 become upright to be substantially parallel to the left and right side members 3F simply by installing the transport container at a take-out location provided with a predetermined vertical guide, and thus manual work-attributable risks and labor can be reduced. In addition, the ribs 7*d* are open above, the transported object can be taken out by narrowing the openings on the front and rear sides of the transport container 800, and thus the footprint of the transport container 800 during unloading can be further reduced as compared with the case of the transport container 700. In addition, according to the method for taking out the object from the upper stage side, there is no need to provide through holes in the left and right side members 3F and there is no need to provide the notch portion 72 in the rib 7*d*, and thus the transport container 800 can be provided in a simpler structure. In addition, during unloading, the ribs 7*d* are capable of continuing to support the front and rear sides of the transported objects on the second and subsequent stages from the top. Preferably, such a transport method is used for transported objects having unfixed relative positions in the horizontal direction in a state of being mutually stacked in that the transported object on the highest stage can be pulled out in the horizontal direction.

Next, other transport containers according to modification examples of the present invention will be described with reference to the drawings.

Figure 22:
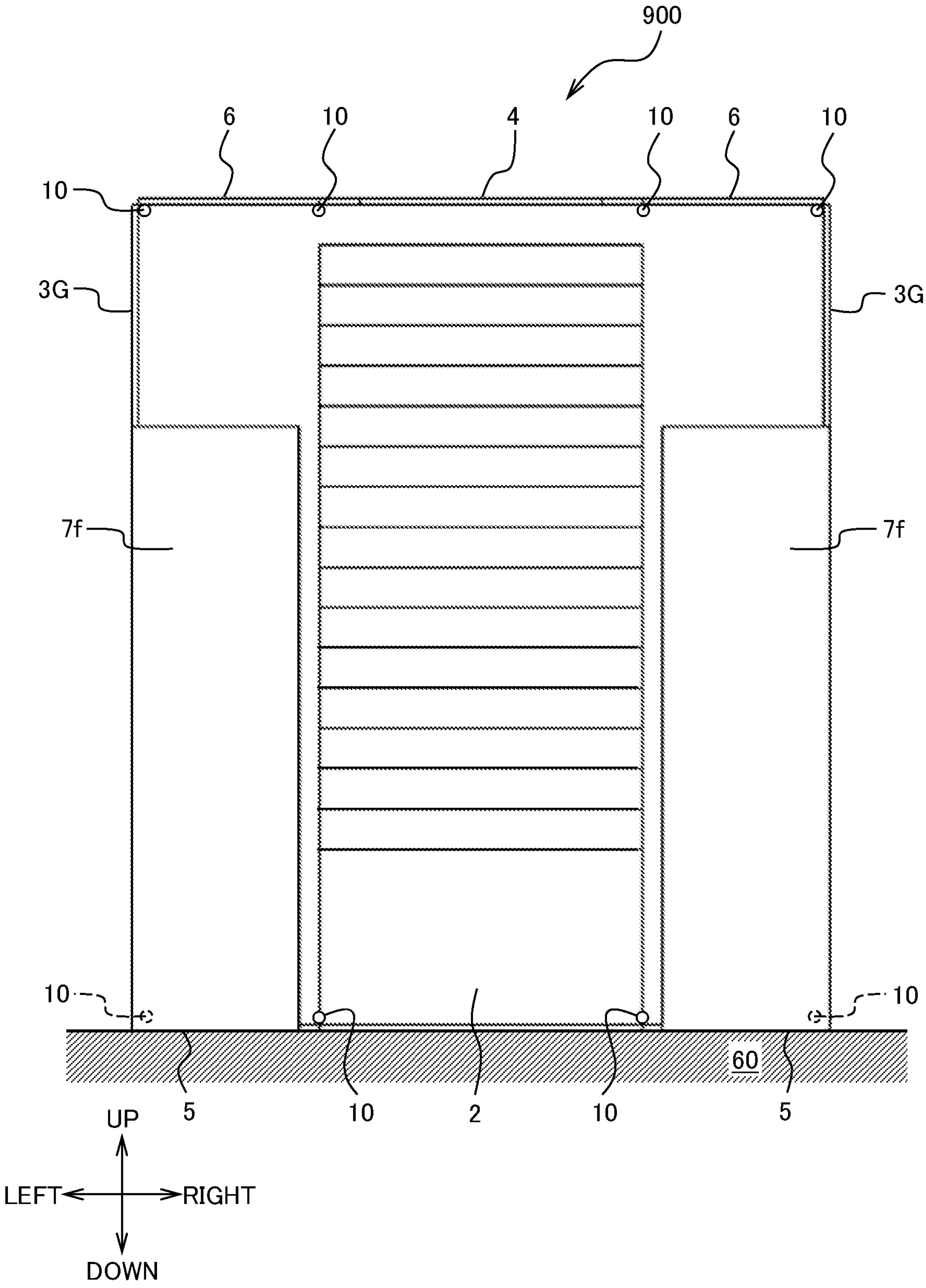
FIG. 22 is a front view illustrating a state where the transport container according to a modification example of the present invention is grounded with transported objects accommodated.
Figure 23:
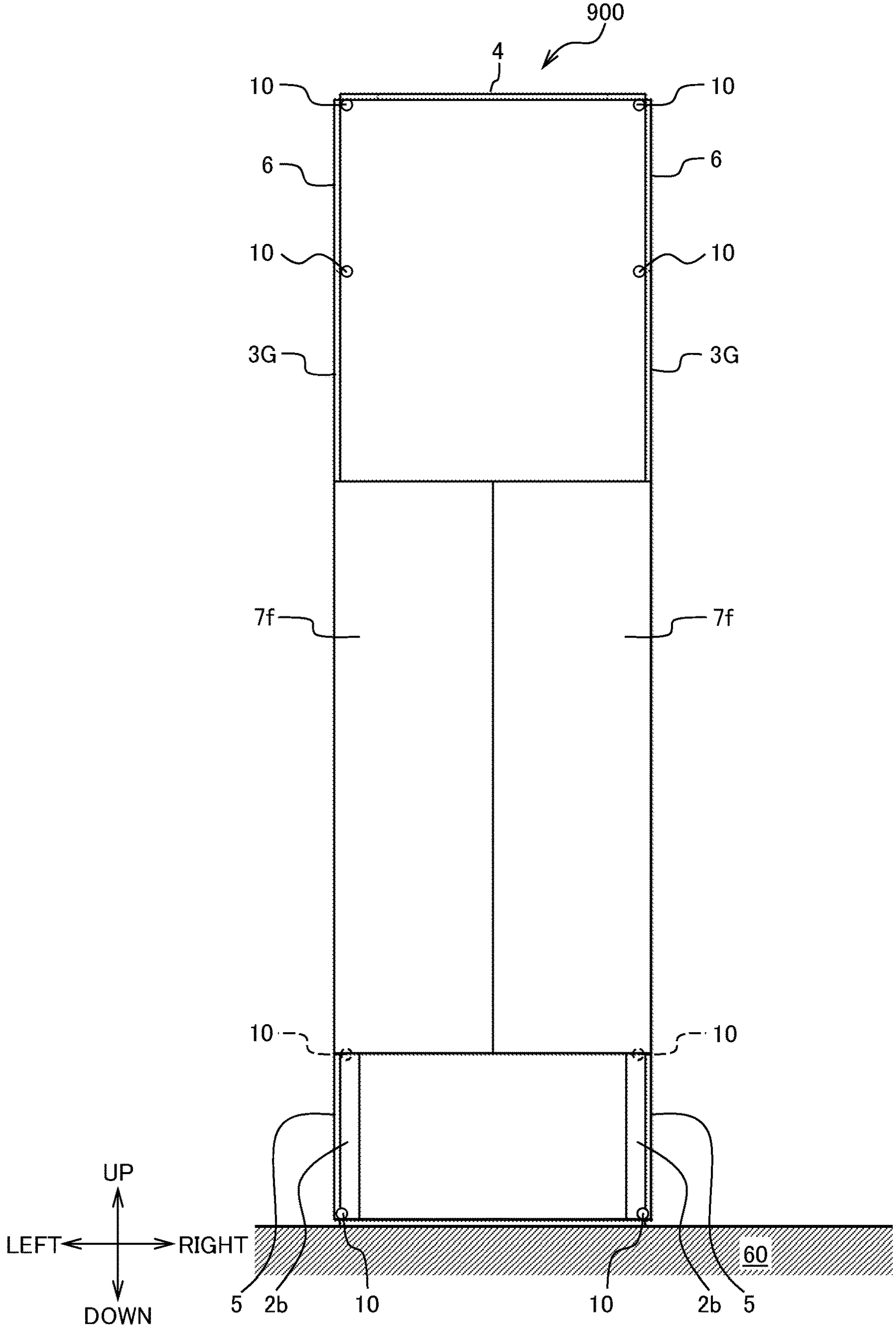
FIG. 23 is a front view illustrating a state during the transport of the transport container according to the modification example of the present invention.

FIG. 22 is a front view illustrating a state where a transport container according to a modification example of the present invention is grounded with transported objects accommodated. FIG. 23 is a front view illustrating a state during the transport of the transport container according to the modification example of the present invention.

As illustrated in FIGS. 22 and 23, the transport container used for transporting a transported object is capable of having a form (transport container 900) including ribs 7*f* with a width at which the left and right ribs 7*f* cover the entire front and rear surfaces of the transported object placed on the bottom member 2 when the handle member 4 is lifted.

In FIGS. 22 and 23, the ribs 7*f* are provided as substantially rectangular parallelepiped thin plate materials at the front and rear ends of a side member 3G on the right side and the front and rear ends of the side member 3G on the left side. The length of each rib 7*f* in the left-right direction is approximately 50% of the length of the bottom member 2 in the left-right direction. It should be noted that the bottom portion of the transport container 900 may be provided with, instead of the bottom member 2, the bottom member 2*a* (see, for example, FIG. 10) of penetration in the front-rear direction and the up-down direction or the bottom member 2*b* (see, for example, FIG. 18) of penetration in the up-down direction only.

By providing the ribs 7*f*, the transported object placed on the bottom member 2 can be supported from both the front and the rear and, in addition, the rib 7*f* is capable of shielding the transported object from light. Transport can be appropriately performed in a case where, for example, the transported object is a microplate or the like used for spectroscopic analysis or the like and a photosensitive reagent is contained. In a case where it is desired to shield the upper part of the transported object from light, a light shielding material may be stacked on the transported object or attached to the handle member 4 or the like.

It should be noted that although the length of each rib 7*f* in the left-right direction is approximately 50% of the length of the bottom member 2 in the left-right direction in FIGS. 22 and 23, the lengths on the left and right may be different from each other insofar as the left and right ribs 7*f* are capable of covering the entire front and rear surfaces of the transported object and the transported object can be put in and taken out when the handle member 4 is not lifted.

Figure 24:
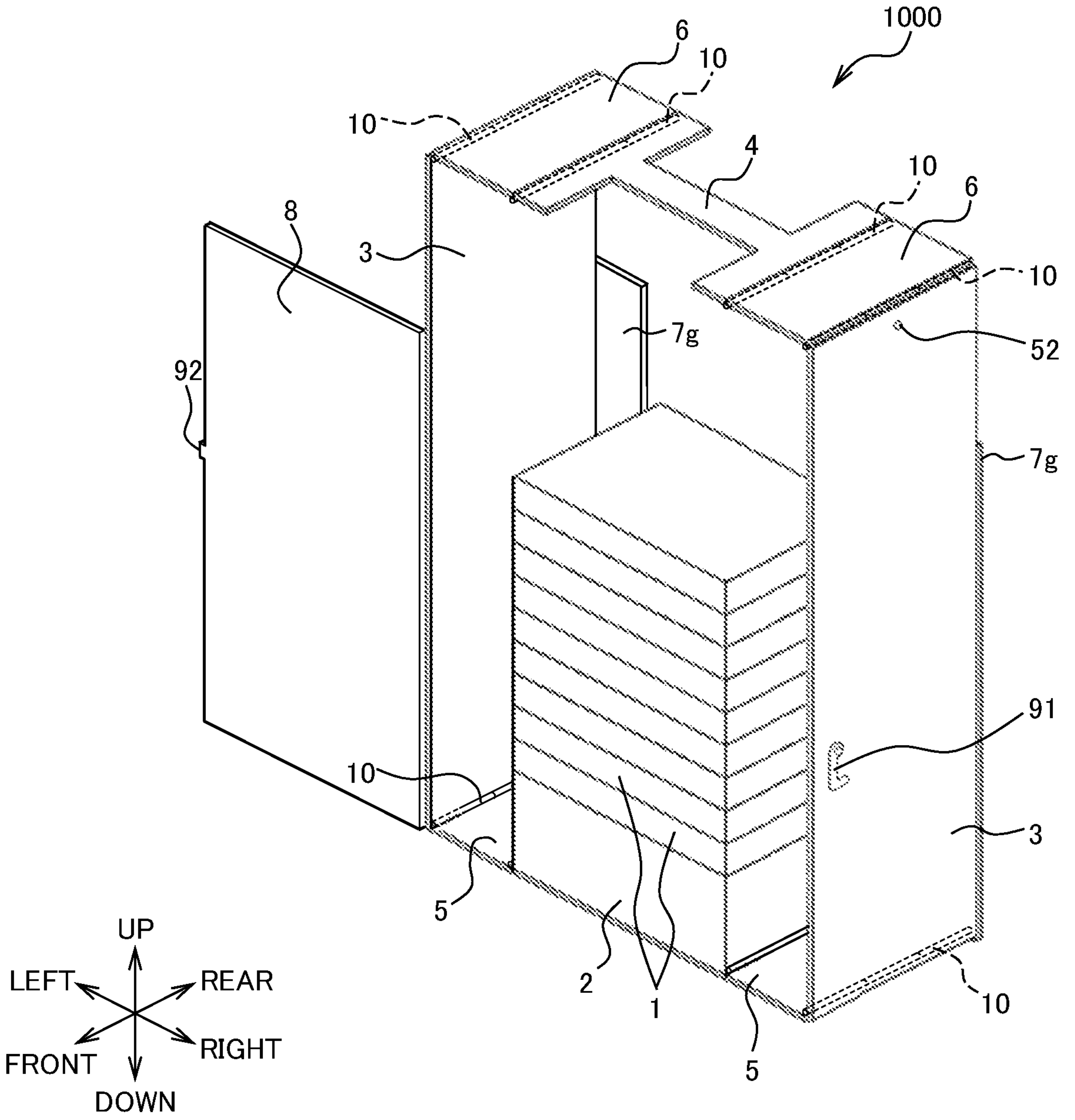
FIG. 24 is a perspective view illustrating a state where the transport container according to a modification example of the present invention is grounded with transported objects accommodated.
Figure 25:
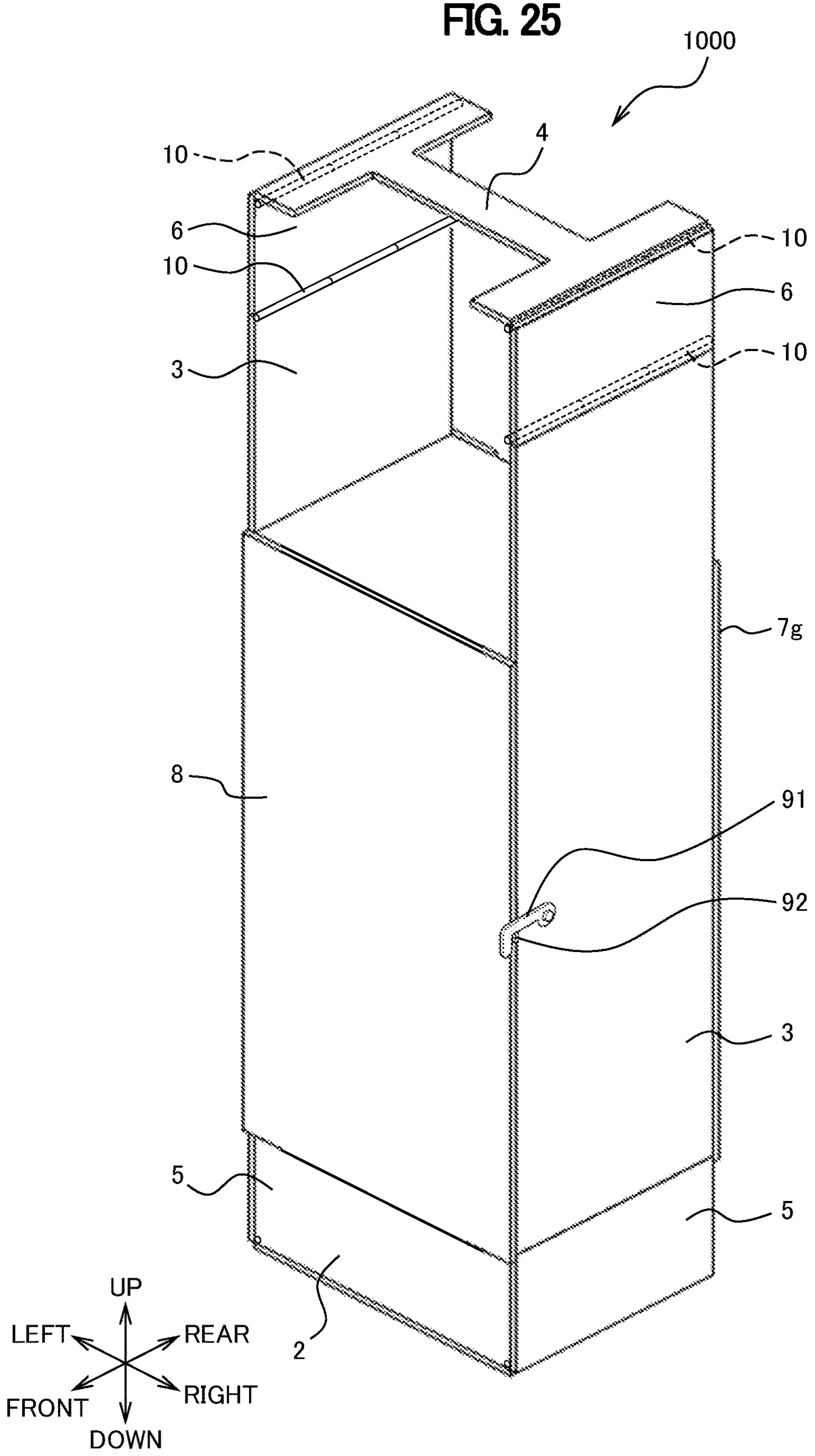
FIG. 25 is a perspective view illustrating a state during the transport of the transport container according to the modification example of the present invention.

FIG. 24 is a perspective view illustrating a state where a transport container according to a modification example of the present invention is grounded with transported objects accommodated. FIG. 25 is a perspective view illustrating a state during the transport of the transport container according to the modification example of the present invention.

As illustrated in FIGS. 24 and 25, the transport container used for transporting a transported object is capable of having a form (transport container 1000) including a door 8 extending toward the inside in the left-right direction from an end portion of the side member 3 in the front-rear direction.

In FIGS. 24 and 25, the front ends of the left and right side members 3 are provided with the door 8 extending toward the inside in the left-right direction instead of the ribs 7 (see, for example, FIG. 1) extending toward the inside in the left-right direction. In addition, the rear ends of the left and right side members 3 are provided with ribs 7*g* with a length in the left-right direction (width) at which the transported objects stacked on the bottom member 2 can be put in and taken out when the handle member 4 is not lifted.

The door 8 is a single swing door and is supported on the front end side of the side member 3 on the left side so as to be openable and closable. The length of the door 8 in the up-down direction is set to a height at which the entire transported object placed on the bottom member 2 is covered from the front. The length of the door 8 in the left-right direction is approximately equal to the length of the bottom member 2 in the left-right direction.

The door 8 and the side member 3 on the left side are provided with stoppers 91 and 92 for locking the door 8 that is closed to the side member 3. In FIGS. 24 and 25, the hook 91 and the tab 92 capable of locking the hook 91 are provided as the stoppers 91 and 92. The hook 91 is rotatably supported by a shaft fixed to the front end side of the side member 3 on the left side. The tab 92 protrudes to the tip side of the door 8.

When the door 8 is closed as illustrated in FIG. 25, the hook 91 can be hooked on the tab 92 by being rotated about the axis thereof. The hook 92 that is locked to the tab 92 works to keep the door 8 closed and keep the lower connecting member 5 and the upper connecting member 6 connected to the side member 3 upright. The hook 91 can be disengaged from the tab 92 by being rotated in the opposite direction.

As in the case of the stoppers 51 and 52 described above, as for the stoppers 91 and 92, the hook 91 and the tab 92 may be replaced with, for example, a doorstop with a hook-catching hole, a slide-type latch, a lever-type latch, a push-type latch, or a box-type latch.

By providing the openable and closable door 8, the accommodated transported objects can be, for example, shielded from light, supported, and protected by the door 8 when the door 8 is closed and the space above the bottom member 2 can be open and the transported objects can be easily put in and taken out when the door 8 is open. In addition, using the structure in which the door 8 that is closed is locked by the stoppers 91 and 92, the side members 3 and so on can be prevented from wobbling in the left-right direction even in a case where the handle member 4 is not lifted.

It should be noted that the door 8 may be provided with the hook 91 and the side member 3 may be provided with the tab 92 although the hook 91 is provided on the front end side of the side member 3 on the left side and the tab 92 is provided on the tip side of the door 8 as for the stoppers 91 and 92 in FIGS. 24 and 25. In addition, the door 8 and the stoppers 91 and 92 may be provided on opposite sides in the left-right direction with a left-opening door provided as the door 8 or the door 8 and the stoppers 91 and 92 may be provided on opposite sides in the front-rear direction.

Although an embodiment of the present invention has been described above, the present invention includes various modification examples that do not depart from the technical scope thereof without being limited to the above embodiment. For example, the above embodiment is not necessarily limited to including every configuration described above. In addition, a part of the configuration of an embodiment can be replaced with another configuration or another configuration can be added to the configuration of an embodiment. In addition, it is also possible to add another configuration, remove a configuration, or replace a configuration with regard to a part of the configuration of an embodiment.

For example, the configuration of the rib 7 provided so as to form an obtuse angle with the side member 3, the configuration of the stoppers 51 and 52 for locking the upright upper connecting member 6 to the upright side member 3, and the configuration of the door 8 and the stoppers 91 and 92 can also be used for each of the transport containers illustrated in FIGS. 10 to 25.

In addition, although the plate-shaped transported object indicated by reference numeral 1 has been illustrated as a transported object that can be stacked in the up-down direction in the transport container according to the above embodiment, the transported object is not limited to an object with a cross section having a rectangular outer shape. The transported object may be any object insofar as the object can be stacked in the up-down direction and is laterally supported by the side member 3. Specific examples of transported object include a microplate, a dish for testing or culture, a vessel, and a precision instrument such as a semiconductor integrated circuit.

In addition, although the left and right side members 3, the left and right lower connecting members 5, and the left and right upper connecting members 6 in the transport container according to the above embodiment are provided as plate materials, the members may be provided as, for example, mesh- or lattice-shaped members. In addition, the bottom member 2 and the handle member 4 can be provided with appropriate shapes and appropriate lengths in the up-down direction. The handle member 4 may be, for example, a handle-attached plate material.

In addition, as for the bottom member 2, the left and right side members 3, the handle member 4, the left and right lower connecting members 5, and the left and right upper connecting members 6, the lengths in the front-rear direction, the lengths in the left-right direction, the lengths in the up-down direction, and so on do not necessarily have to be approximately equal mutually insofar as the container structure according to the above embodiment is maintained and the lengths and shapes thereof may be mutually different insofar as the same action is achieved.

In addition, although the hinge 10 in the transport container according to the above embodiment is provided over the entire length of each inter-member side, the inter-member connection structure is not limited to such a structure. The hinge 10 may be provided at a part of each inter-member side. In addition, the rotating shaft of the hinge 10 may be provided on the outside surface of each member.

REFERENCE SIGNS LIST

1: transported object
2, 2*a*, 2*b*: bottom member
3: side member
4: handle member
5: lower connecting member
6: upper connecting member
7: rib
8: door
10: hinge
31, 32, 33, 34: through hole
51: hook (stopper)
52: stud (stopper)
61, 61*a*: movable stage (transported object lifting and lowering means)
62: stage lift
63: fork (transported object lifting and lowering means)
64: drawer (transported object take-out means)
65, 66, 68: inclined guide

67, 69: vertical guide
71, 72: notch portion
80: roller-type loader
81: roller
82: drive shaft
83: movable member
84: movable tray
91: hook (stopper)
92: tab (stopper)
100, 200, 300, 400, 500: transport container
600, 700, 800, 900, 1000: transport container

The invention claimed is:

1. A transport container used for transporting transported objects and comprising:

a bottom member where the transported object is placed;

left and right side members disposed beside the bottom member;

a handle member disposed above the bottom member;

left and right lower connecting members interconnecting the bottom member and the side members; and left and right upper connecting members interconnecting the side members and the handle member, wherein the bottom member and the lower connecting members, the lower connecting members and the side members, the side members and the upper connecting members, and the upper connecting members and the handle member are respectively interconnected via left and right hinges having rotating shafts parallel and horizontal with respect to left and right side surfaces of the bottom member, when the handle member is not lifted, the lower connecting members and the upper connecting members are laid to be non-parallel to the side members and the side members are separated from the bottom member, and when the handle member is lifted, the lower connecting members and the upper connecting members become upright and the side members approach the bottom member to laterally support the transported object placed on the bottom member.

2. The transport container according to claim 1, wherein ribs extending toward an inside in a left-right direction are provided at front and rear ends of the side member, and when the handle member is lifted, the ribs support the transported object placed on the bottom member from the front and rear.

3. The transport container according to claim 2, wherein the rib protrudes downward beyond a lower end of the side member.

4. The transport container according to claim 2, wherein the rib forms an obtuse angle with the side member in a plan view of the transport container.

5. The transport container according to claim 1, comprising a stopper for locking the lower connecting member in an upright state or the upper connecting member in an upright state to the side member in an upright state.

6. The transport container according to claim 1, wherein the side member has a through hole for inserting transported object lifting and lowering means between the transported objects placed on the bottom member.

7. The transport container according to claim 1, comprising a rib extending toward an inside in a left-right direction in an end portion of the side member in a front-rear direction, wherein the rib has a shape in which an inside of a lower end portion of the rib in the left-right direction is notched.

8. The transport container according to claim 1, comprising a rib extending toward an inside in a left-right direction in an end portion of the side member in a front-rear direction, wherein the rib has a length at which a lower end portion of the rib is positioned above an upper end of the bottom member when the handle member is lifted.

9. The transport container according to claim 1, wherein the bottom member has a penetration structure of penetration in an up-down direction for inserting transported object lifting and lowering means from below the transported object placed on the bottom member.

10. The transport container according to claim 1, comprising a rib extending toward an inside in a left-right direction in an end portion of the side member in a front-rear direction, wherein the rib has a shape in which an inside of an upper end portion of the rib in the left-right direction is notched.

11. The transport container according to claim 1, comprising a rib extending toward an inside in a left-right direction in an end portion of the side member in a front-rear direction, wherein the rib has a width at which the left and right ribs cover front and rear surfaces as a whole of the transported object placed on the bottom member when the handle member is lifted.

12. The transport container according to claim 11, comprising an openable and closable door extending toward the inside in the left-right direction in the end portion of the side member in the front-rear direction, wherein the door has a width at which the entire front or rear surface of the transported object placed on the bottom member is covered when the handle member is lifted.

13. A transport method for individually taking out transported objects stacked in an up-down direction and accommodated in a transport container, wherein the transport container is used for transporting the transported objects and includes:

a bottom member where the transported object is placed;

left and right side members disposed beside the bottom member;

a handle member disposed above the bottom member;

left and right lower connecting members interconnecting the bottom member and the side members; and left and right upper connecting members interconnecting the side members and the handle member, the bottom member and the lower connecting members, the lower connecting members and the side members, the side members and the upper connecting members, and the upper connecting members and the handle member are respectively interconnected via left and right hinges having rotating shafts parallel and horizontal with respect to left and right side surfaces of the bottom member, when the handle member is not lifted, the lower connecting members and the upper connecting members are laid to be non-parallel to the side members and the side members are separated from the bottom member, when the handle member is lifted, the lower connecting members and the upper connecting members become upright and the side members as structures approach the bottom member to laterally support the transported object placed on the bottom member, with the transported object stacked in the up-down direction and accommodated, the transport container is installed at an unloading location such that the lower connecting member and the upper connecting member are laid to be non-parallel to the side member, and the transported object placed on the bottom member is taken out from a front or rear between the left and right side members.

14. The transport method according to claim 13, wherein the side member has a through hole for inserting transported object lifting and lowering means between the transported objects placed on the bottom member, with the transported object stacked in the up-down direction and accommodated, the transport container is installed at the unloading location such that the lower connecting member and the upper connecting member are laid to be non-parallel to the side member, the lifting and lowering means is inserted through the through hole between the transported object on the lowest stage placed on the bottom member and the transported object on the second stage from the bottom and the transported objects on the second and subsequent stages are lifted, and the transported object on the lowest stage is taken out from the front or rear between the left and right side members.

15. The transport method according to claim 14, wherein the transport container includes a rib extending toward an inside in a left-right direction in an end portion of the side member in a front-rear direction, the rib has a shape in which an inside of a lower end portion of the rib in the left-right direction is notched, with the transported object stacked in the up-down direction and accommodated, the transport container is installed at an unloading location provided with an inclined guide rising toward an outside in the left-right direction such that the lower connecting member and the upper connecting member are inclined to be non-parallel to the side member and a front or rear surface of the transported object on the lowest stage is exposed from the parts where the ribs are notched between the left and right side members, the lifting and lowering means is inserted through the through hole between the transported object on the lowest stage placed on the bottom member and the transported object on the second stage from the bottom and the transported objects on the second and subsequent stages are lifted, and the transported object on the lowest stage is taken out of the parts where the ribs are notched between the left and right side members.

16. The transport method according to claim 14, wherein the transport container includes a rib extending toward an inside in a left-right direction in an end portion of the side member in a front-rear direction, the rib has a length at which a lower end portion of the rib is positioned above an upper end of the bottom member when the handle member is lifted, with the transported object stacked in the up-down direction and accommodated, the transport container is installed at an unloading location provided with an inclined guide rising toward an outside in the left-right direction such that the lower connecting member and the upper connecting member are inclined to be non-parallel to the side member or installed at an unloading location where an inside surface in the left-right direction is vertically provided such that the lower connecting member and the upper connecting member become upright and a front or rear surface of the transported object on the lowest stage is exposed from below the ribs between the left and right side members, the lifting and lowering means is inserted through the through hole between the transported object on the lowest stage placed on the bottom member and the transported object on the second stage from the bottom and the transported objects on the second and subsequent stages are lifted, and the transported object on the lowest stage is taken out from below the ribs between the left and right side members.

17. The transport method according to claim 13, wherein the bottom member has a through hole for inserting transported object lifting and lowering means from below the transported object placed on the bottom member, with the transported object stacked in the up-down direction and accommodated, the transport container is installed at the unloading location such that the lower connecting member and the upper connecting member are laid to be non-parallel to the side member, the lifting and lowering means is inserted through the through hole from below the transported object on the lowest stage placed on the bottom member and the transported object on every stage is lifted, and the transported object on the highest stage is taken out from the front or rear between the left and right side members.

18. The transport method according to claim 17, wherein the transport container includes a rib extending toward an inside in a left-right direction in an end portion of the side member in a front-rear direction, the rib has a shape in which an inside of an upper end portion of the rib in the left-right direction is notched, with the transported object stacked in the up-down direction and accommodated, the transport container is installed at an unloading location provided with an inclined guide rising toward an outside in the left-right direction such that the lower connecting member and the upper connecting member are inclined to be non-parallel to the side member and a front or rear surface of the transported object on the highest stage is exposed from the parts where the ribs are notched between the left and right side members, and the transported object on the highest stage is taken out of the parts where the ribs are notched between the left and right side members.

19. The transport method according to claim 17, wherein the transport container includes a rib extending toward an inside in a left-right direction in an end portion of the side member in a front-rear direction, the rib has a length at which an upper end portion of the rib is positioned below a lower end of the handle member when the handle member is lifted, with the transported object stacked in the up-down direction and accommodated, the transport container is installed at an unloading location provided with an inclined guide rising toward an outside in the left-right direction such that the lower connecting member and the upper connecting member are inclined to be non-parallel to the side member or installed at an unloading location where an inside surface in the left-right direction is vertically provided such that the lower connecting member and the upper connecting member become upright and a front or rear surface of the transported object on the highest stage is exposed from above the ribs between the left and right side members, and the transported object on the highest stage is taken out from above the ribs between the left and right side members.

* * * * *